US012669769B2

(12) United States Patent
Watanabe et al.

(10) Patent No.: US 12,669,769 B2
(45) Date of Patent: Jun. 30, 2026

(54) IMAGE FORMING APPARATUS

(71) Applicants: Kazuhiko Watanabe, Kanagawa (JP); Shotaro Hoshi, Kanagawa (JP); Takaaki Tawada, Kanagawa (JP); Hirofumi Fujii, Kanagawa (JP)

(72) Inventors: Kazuhiko Watanabe, Kanagawa (JP); Shotaro Hoshi, Kanagawa (JP); Takaaki Tawada, Kanagawa (JP); Hirofumi Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/795,785

(22) Filed: Aug. 6, 2024

(65) Prior Publication Data

US 2025/0076805 A1 Mar. 6, 2025

(30) Foreign Application Priority Data

Aug. 31, 2023 (JP) ................................. 2023-141456

(51) Int. Cl.

*G03G 15/00* (2006.01)
*G03G 15/01* (2006.01)
*G03G 15/16* (2006.01)

(52) U.S. Cl.

CPC ..... *G03G 15/5054* (2013.01); *G03G 15/0131* (2013.01); *G03G 15/0189* (2013.01);
(Continued)

(58) Field of Classification Search

CPC ............. G03G 15/161; G03G 15/1615; G03G 15/0189; G03G 15/50; G03G 15/5008; G03G 2215/1661
See application file for complete search history.

(56) References Cited

U.S. PATENT DOCUMENTS

| | | | | |
|---|---|---|---|---|
| 2007/0122210 A1* | 5/2007 | Sato | G03G 21/0011 | 399/301 |
| 2009/0087206 A1* | 4/2009 | Koide | G03G 15/161 | 399/71 |

(Continued)

FOREIGN PATENT DOCUMENTS

| | | |
|---|---|---|
| JP | 2011-227207 A | 11/2011 |
| JP | 2016-020970 A | 2/2016 |
| JP | 2020-197684 A | 12/2020 |

OTHER PUBLICATIONS

Machine Translation of JP 2011-.227207 (Year: 2011).*
U.S. Appl. No. 18/566,291 filed Dec. 1, 2023.

*Primary Examiner* — Carla J Therrien
(74) *Attorney, Agent, or Firm* — Harness, Dickey & Pierce, P.L.C.

(57) ABSTRACT

An image forming apparatus includes an image bearer, an image forming unit, a transferor, a cleaner, and circuitry. The image bearer is movable in a moving direction at multiple linear speeds. The image forming unit contacts the image bearer to form one or more patterns on the image bearer with toner. The transferor contacts the image bearer to form a transfer nip. The cleaner contacts the image bearer to clean the one or more patterns on the image bearer. The circuitry is configured to set one of the multiple linear speeds, determine a number of the one or more patterns based on the one of the multiple linear speeds, and control the image forming unit to form one pattern on the image bearer or form multiple patterns on the image bearer at a predetermined interval in the moving direction.

12 Claims, 11 Drawing Sheets

(52) U.S. Cl.
CPC ....... *G03G 15/161* (2013.01); *G03G 15/1615* (2013.01); *G03G 15/5004* (2013.01); *G03G 15/80* (2013.01); *G03G 2215/1661* (2013.01)

(56) References Cited

U.S. PATENT DOCUMENTS

| | | | | |
|---|---|---|---|---|
| 2010/0272455 | A1* | 10/2010 | Muramoto | G03G 15/50<br>399/66 |
| 2014/0169813 | A1* | 6/2014 | Seki | G03G 15/161<br>399/53 |
| 2014/0348521 | A1 | 11/2014 | Mase et al. | |
| 2015/0117884 | A1 | 4/2015 | Sugiyama et al. | |
| 2017/0227914 | A1* | 8/2017 | Ueno | G03G 21/0011 |
| 2022/0091543 | A1* | 3/2022 | Saito | G03G 15/01 |
| 2023/0056875 | A1 | 2/2023 | Hoshi et al. | |
| 2024/0280933 | A1* | 8/2024 | Kobayashi | G03G 15/5041 |

* cited by examiner

IMAGE FORMING APPARATUS

CROSS-REFERENCE TO RELATED APPLICATION

This patent application is based on and claims priority pursuant to 35 U.S.C. § 119 (a) to Japanese Patent Application No. 2023-141456, filed on Aug. 31, 2023, in the Japan Patent Office, the entire disclosure of which is hereby incorporated by reference herein.

BACKGROUND

Technical Field

Embodiments of the present disclosure relate to an image forming apparatus.

Related Art

An image forming apparatus in the related art includes an image bearer, a transferor contacting the image bearer to form a transfer nip, and a cleaner to clean the surface of the image bearer. The image forming apparatus forms a toner image pattern on the image bearer to input toner to the cleaner. The toner image pattern is not transferred to a recording medium.

SUMMARY

This specification describes an improved image forming apparatus that includes an image bearer, an image forming unit, a transferor, a cleaner, and circuitry. The image bearer is movable in a moving direction at multiple linear speeds. The image forming unit contacts the image bearer to form one or more patterns on the image bearer with toner. The transferor contacts the image bearer to form a transfer nip. The cleaner contacts the image bearer to clean the one or more patterns on the image bearer. The circuitry is configured to set one of the multiple linear speeds, determine a number of the one or more patterns based on the one of the multiple linear speeds, and control the image forming unit to form one pattern of the one or more patterns on the image bearer, or form multiple patterns of the one or more patterns on the image bearer at a predetermined interval in the moving direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
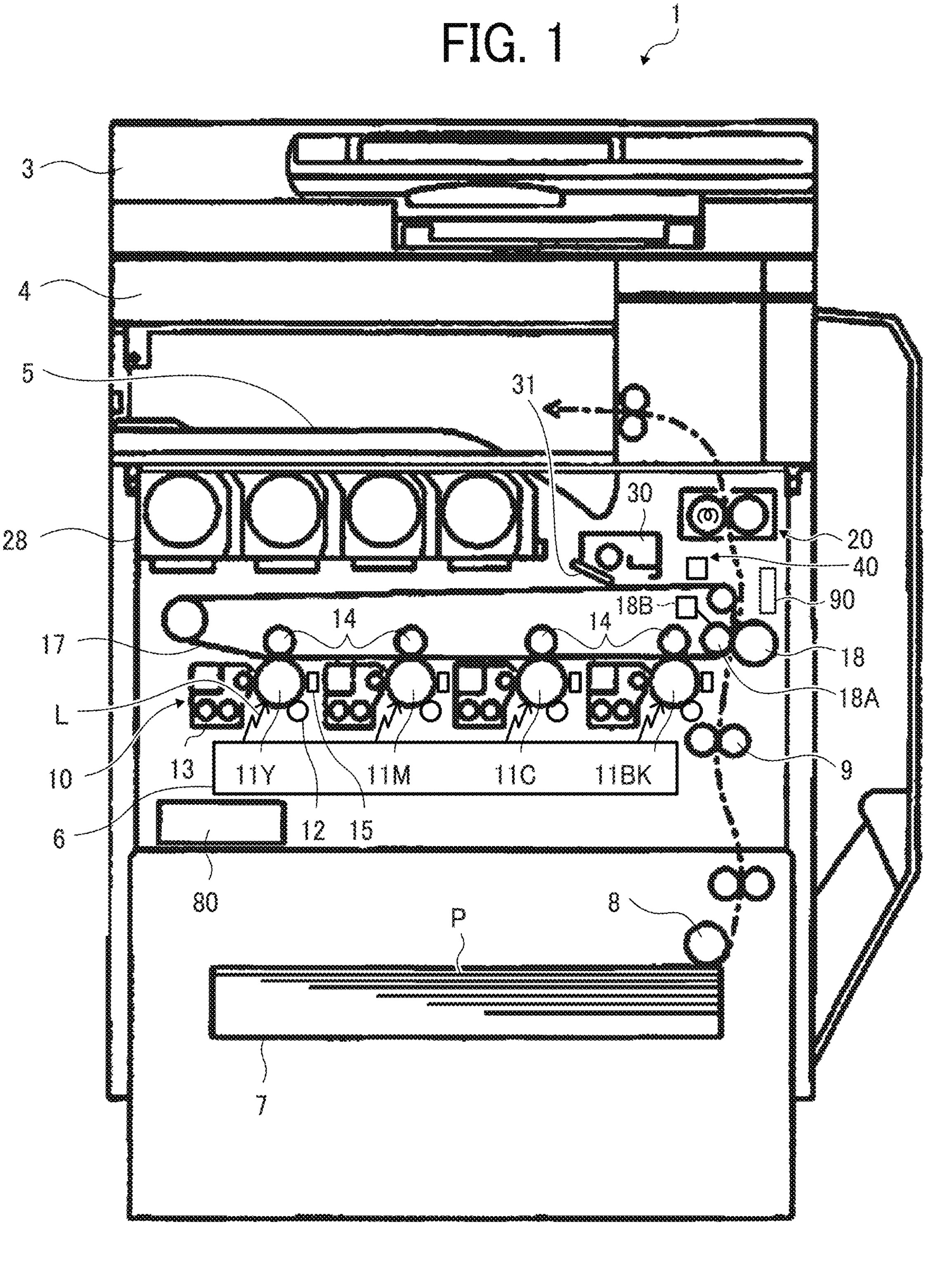
FIG. 1 is a schematic diagram of a configuration of a tandem color copier, which may be referred to simply as a copier in the following description, as an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the accompanying drawings. Note that it is easy for a person skilled in the art to modify or amend the present disclosure within the scope of the claims to form another embodiment, and these modifications or amendments are included in the scope of the claims. The following description is an example of the best mode of the present disclosure and does not limit the scope of the claims.

FIG. 1 is a schematic diagram of a configuration of a tandem color copier, which may be referred to simply as a copier in the following description, as an image forming apparatus.

In FIG. 1, a tandem color copier 1, which may be referred to simply as a copier 1 in the following description, as an image forming apparatus includes a document conveying device 3 that conveys a document to a scanner 4, the scanner 4 that reads an image of the document, an output tray 5 on which recording media having output images are stacked, and a sheet feeding device 7 that accommodates sheets P as recording media.

In addition, the copier 1 includes a registration roller pair 9 (in other words, a timing roller pair) to adjust the timing for conveying the sheet P and image forming units 10 to form a yellow toner image, a magenta toner image, a cyan toner image, and a black toner image. The image forming units 10 include, for example, photoconductor drums 11Y, 11M, 11C, and 11BK serving as latent image bearers on which toner images are formed and a writing device (in other words, an exposure device) 6. In each of the image forming units 10, a charger 12, a developing device 13, and a cleaner 15 are disposed around each of the photoconductor drums 11Y, 11M, 11C, and 11BK.

The charger 12 uniformly charges the surface of each of the photoconductor drums. The writing device (in other words, an exposure device) 6 emits laser light according to input image data and writes electrostatic latent images on the photoconductor drums 11Y, 11M, 11C, and 11BK. The developing device 13 develops the electrostatic latent image written on the photoconductor drum. The cleaner 15 removes untransferred toner remaining on the photoconductor drum.

The copier 1 further includes primary transfer rollers 14, an intermediate transfer belt 17 as an image bearer contacting the photoconductor drums, a secondary transfer roller 18 as a transferor, and a fixing device 20. Primary transfer biases are applied to the primary transfer rollers 14, and the yellow toner image, the magenta toner image, the cyan toner image, and the black toner image formed on the photoconductor drums 11Y, 11M, 11C, and 11BK are transferred and superimposed onto the intermediate transfer belt 17 to form a color toner image on the intermediate transfer belt 17. The secondary transfer roller 18 transfers the color toner image to the sheet P. The fixing device 20 fixes the color toner image, which is an unfixed image, onto the sheet P. The copier 1 includes a toner container section 28 to store toner bottles containing yellow toner, magenta toner, cyan toner, and black toner that are supplied to developing devices 13, respectively. The copier 1 includes a belt cleaner 30 and a waste toner container 80. The belt cleaner 30 removes toner that is not transferred and remains on the surface of the intermediate transfer belt 17. The removed toner is collected as waste toner and stored in the waste toner container 80. The copier 1 further includes a controller 90 including a central processing unit (CPU), a random-access memory (RAM), and a read-only memory (ROM).

A description is given below of typical operations of the image forming apparatus to form the color toner image.

A conveyance roller of the document conveying device 3 conveys a document on a document table onto a platen of the scanner 4. The scanner 4 optically scans the document on the platen to read image data.

Specifically, the scanner 4 scans an image of the document on the platen while irradiating the image with light emitted from an illumination lamp and forms an image of light reflected from the document on a color sensor via a mirror group and a lens. The color sensor reads the color image data of the document for each of decomposed light colors of red, green, and blue (RGB) and converts the color image data into electrical image signals. An image processing device performs processing such as color conversion, color calibration, and spatial frequency correction based on the electrical image signals of the decomposed light colors of RGB to acquire color image data of yellow, magenta, cyan, and black.

The yellow, magenta, cyan, and black image data are transmitted to the writing device 6. The writing device 6 emits laser beams L toward the surfaces of the photoconductor drums 11Y, 11M, 11C, and 11BK according to the image data of yellow, magenta, cyan, and black, respectively.

Each of the four photoconductor drums 11Y, 11M, 11C, and 11BK rotates clockwise in FIG. 1. The chargers 12 disposed opposite the photoconductor drums 11Y, 11M, 11C, and 11BK uniformly charge the surfaces of the photoconductor drums 11Y, 11M, 11C, and 11BK, respectively, which is referred to as a charging process. Thus, the surface of each of the photoconductor drums 11Y, 11M, 11C, and 11BK is charged to a charging potential. Subsequently, the charged surface of each of the photoconductor drums 11Y, 11M, 11C, and 11BK reaches an irradiation position to be irradiated with the corresponding laser light.

The writing device 6 emits laser beams L corresponding to four colors from four light sources according to the image data. The laser beams L pass through different optical passages for the different color components of yellow, magenta, cyan, and black, which is referred to as an exposure process.

The laser beam corresponding to the yellow component is emitted to the surface of the leftmost photoconductor drum 11Y in FIG. 1. A polygon mirror that rotates at high velocity deflects the laser beam for yellow along the axis of rotation of the photoconductor drum 11Y (i.e., main scanning direction) so that the laser beam scans the surface of the photoconductor drum 11Y. Thus, an electrostatic latent image corresponding to the yellow component is formed on the surface of the photoconductor drum 11Y after the charger 12 charges the surface of the photoconductor drum 11Y.

Similarly, the laser beam corresponding to the magenta component is emitted to the surface of the second photoconductor drum 11M from the left in FIG. 1. Thus, an electrostatic latent image corresponding to the magenta component is formed. The laser beam corresponding to the cyan component is emitted to the surface of the third photoconductor drum 11C from the left in FIG. 1. Thus, an electrostatic latent image corresponding to the cyan component is formed. The laser beam corresponding to the black component is emitted to the surface of the fourth photoconductor drum 11BK from the left in FIG. 1. Thus, an electrostatic latent image corresponding to the black component is formed.

After the electrostatic latent images corresponding to yellow, magenta, cyan, and black are formed on the surfaces of the photoconductor drums 11Y, 11M, 11C, and 11BK, respectively, each surface bearing the electrostatic latent image reaches a position opposite the developing device 13. The developing device 13 supplies toner of each color onto the surface of each of the photoconductor drums 11Y, 11M, 11C, and 11BK and develops the electrostatic latent image on each of the photoconductor drums 11Y, 11M, 11C, and 11BK into a toner image, which is referred to as a development process.

The surface of each of the photoconductor drums 11Y, 11M, 11C, and 11BK after the development process reaches a position opposite the intermediate transfer belt 17 as an image bearer. The primary transfer rollers 14 are disposed at positions where the photoconductor drums 11Y, 11M, 11C, and 11BK face the intermediate transfer belt 17 and contact an inner circumferential surface of the intermediate transfer belt 17. At the positions of the primary transfer rollers 14, the toner images on the photoconductor drums 11Y, 11M, 11C, and 11BK are sequentially transferred to and superimposed on the intermediate transfer belt 17, forming the color toner image thereon, which is referred to as a primary transfer process.

The surface of each of the photoconductor drums 11Y, 11M, 11C, and 11BK after the primary transfer process reaches a position opposite the cleaner 15. After the primary transfer process, toner that is not transferred to the intermediate transfer belt 17 remains on the surface of each of the photoconductor drums 11Y, 11M, 11C, and 11BK. The cleaner 15 removes and collects the toner remaining on the surface, which is referred to as a cleaning process. The toner removed and collected in the cleaner 15 is conveyed to and collected in the waste toner container 80 as waste toner via a conveyance passage. The surface of each of the photoconductor drums 11Y, 11M, 11C, and 11BK after the cleaning process passes by a discharger. Thus, a series of image forming processes performed on the photoconductor drums 11Y, 11M, 11C, and 11BK is completed.

On the other hand, after the toner images on the photoconductor drums 11Y, 11M, 11C, and 11BK are sequentially transferred to and superimposed on the intermediate transfer belt 17 to form the color toner image on the intermediate transfer belt 17 as an image bearer, the intermediate transfer belt 17 bearing the color toner image rotates counterclockwise in FIG. 1, and the color toner image faces the secondary transfer roller 18. The secondary transfer roller 18 contacts the intermediate transfer belt 17 to form a secondary transfer nip as a transfer nip. The color toner image borne on the intermediate transfer belt 17 is secondarily transferred onto the sheet P at the secondary transfer nip, which is referred to as a secondary transfer process.

The copier 1 includes a power source 18B that outputs a bias having a negative polarity as a transfer bias and a bias having a positive polarity. The power source 18B is coupled to an opposed roller 18A facing the secondary transfer roller 18 via the intermediate transfer belt 17. The controller 90 controls the power source 18B to apply a secondary transfer bias to the opposed roller 18A. The secondary transfer roller 18 is electrically grounded. When the color toner image on the intermediate transfer belt 17 is secondarily transferred onto the sheet P, a transfer bias having a negative polarity, which is a normal charging polarity of the toner, is applied to the opposed roller 18A as a transfer bias so that the normally charged toner having the negative polarity on the intermediate transfer belt 17 is repulsively transferred onto the sheet P.

The outer circumferential surface of the intermediate transfer belt 17 after the secondary transfer process reaches a position of the belt cleaner 30. The belt cleaner 30 includes a cleaning blade 31 as a cleaner. The cleaning blade 31 removes the toner that is not secondarily transferred to the sheet P and adheres to the intermediate transfer belt 17. The toner removed by the cleaning blade is conveyed to and collected in the waste toner container 80 as waste toner via the conveyance passage.

The sheet P is conveyed from the sheet feeding device 7 via the registration roller pair 9 to the secondary transfer nip between the intermediate transfer belt 17 and the secondary transfer roller 18.

Specifically, the sheet P fed by a sheet feeding roller 8 from the sheet feeding device 7 that accommodates the sheets P passes through a conveyance guide and is directed to the registration roller pair 9. The sheet P that has reached the registration roller pair 9 is conveyed toward the secondary transfer nip, timed to coincide with the arrival of the color toner image on the intermediate transfer belt 17.

After the color toner image is transferred to the sheet P in the secondary transfer process, the sheet P is conveyed to the fixing device 20. The fixing device 20 fixes the color toner image onto the sheet P at a nip between a fixing roller and a pressure roller. The sheet P after the fixing process is ejected by an output roller pair as an output image to an outside of an apparatus body of the copier 1. Thus, the sheets P lie stacked on the output tray 5. Accordingly, a series of image forming processes is completed. The controller 90 controls the above-described various devices and components to perform the series of image forming processes.

The controller 90 in the copier 1 performs control called process control at a given point in time to keep the image quality stable over time or even when the environment changes.

Figure 2:
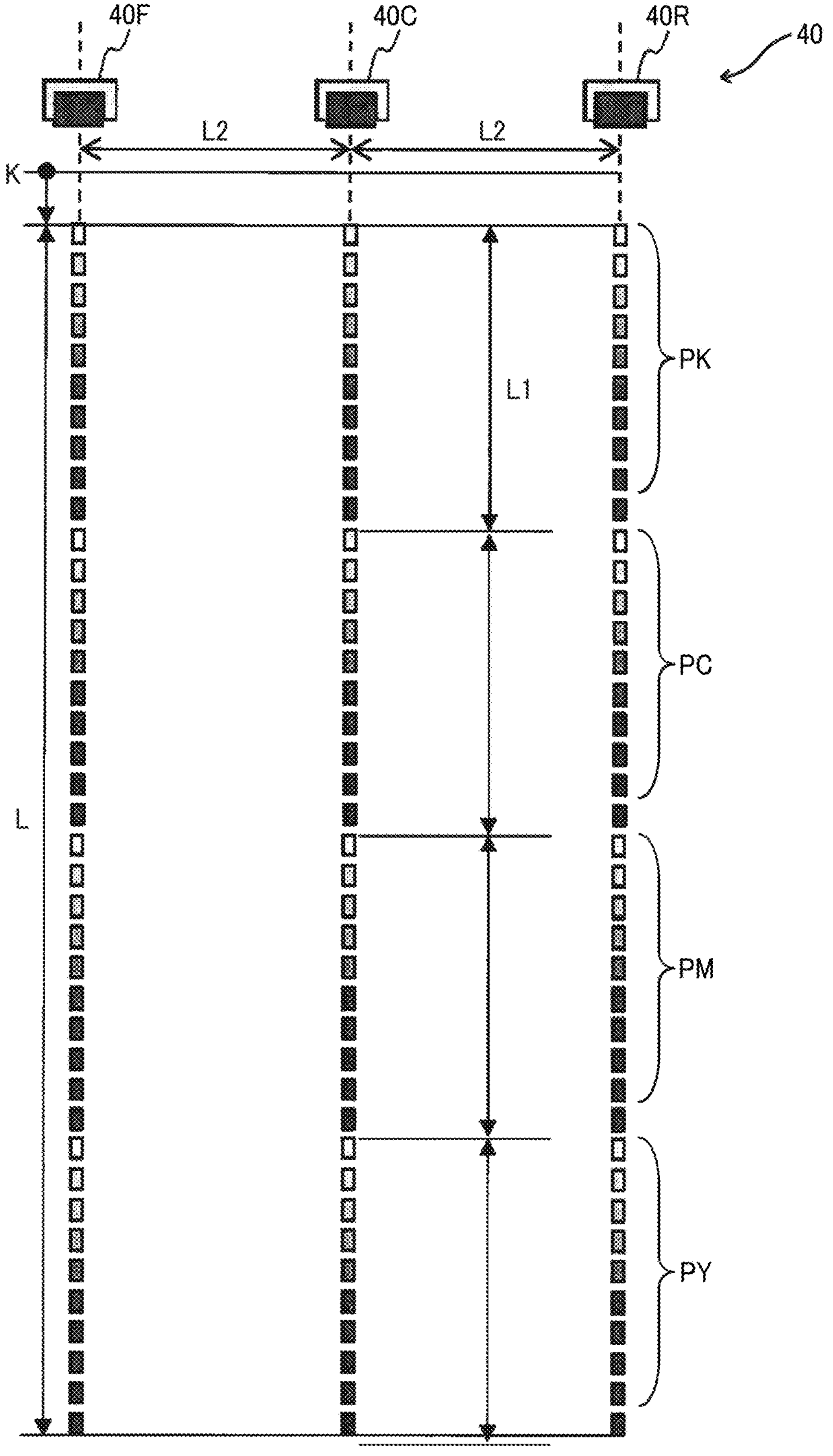
FIG. 2 is a schematic diagram illustrating gradation patterns on an intermediate transfer belt.

FIG. 2 is a schematic diagram illustrating gradation patterns on an intermediate transfer belt.

The gradation pattern includes a plurality of toner patches having different image densities. The gradation pattern is formed at a position at which the intermediate transfer belt 17 faces an optical sensor. Specifically, the plurality of toner patches are formed at the center and opposed ends in a width direction of the intermediate transfer belt 17 on the intermediate transfer belt 17. The width direction of the intermediate transfer belt 17 is a direction orthogonal to a belt moving direction in which the intermediate transfer belt 17 moves. In the example illustrated in FIG. 2, gradation patterns PK, PC, PM, and PY for black, cyan, magenta, and yellow, respectively, are formed from the top.

An optical sensor device 40 includes optical sensors 40R, 40C, and 40F as a plurality of adhesion amount detectors aligned at given intervals in the width direction of the intermediate transfer belt 17. Each of the optical sensors 40R, 40C, and 40F outputs a signal corresponding to the light reflectance of the intermediate transfer belt 17 or the gradation patterns PK, PC, PM, and PY on the intermediate transfer belt 17, thus detecting a toner adhesion amount, which is an amount of toner adhering to the intermediate transfer belt 17. The controller 90 in the copier 1 adjusts an image forming condition such as a developing bias Vb based on the detected toner adhesion amount.

Figure 3:
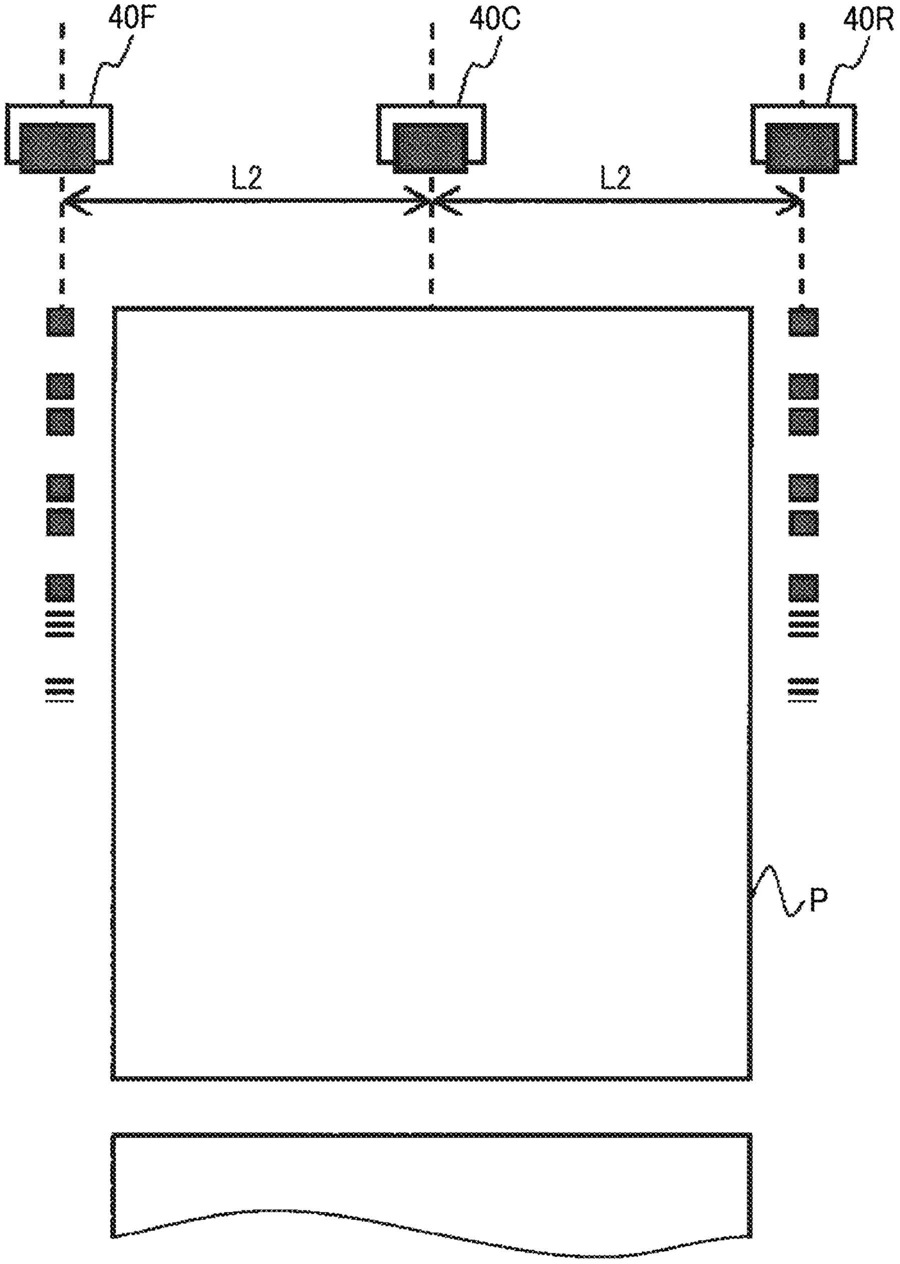
FIG. 3 is a schematic diagram illustrating an image adjustment pattern formed on the intermediate transfer belt to perform image adjustment in parallel with a printing operation.

The optical sensors 40R and 40F facing both ends of the intermediate transfer belt 17 in the width direction of the intermediate transfer belt 17 are disposed outside a sheet conveyance area as a recording medium conveyance area of the intermediate transfer belt 17. As illustrated in FIG. 3, during the formation of a toner image to be transferred to the sheet P, the controller 90 in the copier 1 controls the image forming units 10 to form image adjustment patterns outside the sheet conveyance area and detect, with the optical sensors 40R and 40F, the toner adhesion amounts of the image adjustment patterns. Based on the toner adhesion amounts detected by the optical sensors 40R and 40F, the controller 90 adjusts the developing bias to adjust the image density, for example.

A mother component of the toner, silica or titanium oxide added to the toner, and other so-called external additives of the toner are transferred from each of the photoconductor drums 11Y, 11M, 11C, and 11BK to the intermediate transfer belt 17. The external additives of the toner transferred to the intermediate transfer belt 17 may adhere to the intermediate transfer belt 17 and cause filming on the intermediate transfer belt 17. If the copier 1 includes a lubricant application device to apply lubricant to the surface of the photoconductor drums 11Y, 11M, 11C, and 11BK, various components included in the lubricant, such as boron nitride or zinc stearate are also transferred from the photoconductor drums 11Y, 11M, 11C, and 11BK to the intermediate transfer belt 17 in addition to the external additives of the toner.

The external additives of the toner and the lubricant may interact with each other and worsen the filming on the intermediate transfer belt 17. Further, paper dust may be transferred from the sheet P to the intermediate transfer belt 17 at the secondary transfer nip and may adhere to the intermediate transfer belt 17, resulting in paper dust filming.

Such filming on the intermediate transfer belt 17 is caused by filming substances, such as the external additives of the toner including silica and various components included in the lubricant, adhering to the intermediate transfer belt 17 when the intermediate transfer belt 17 receives external pressure (for example, contact pressure from the photoconductor drums 11Y, 11M, 11C, and 11BK). The occurrence of the filming on the intermediate transfer belt 17 causes the occurrence of abnormal images such as white spots in a full solid image or a halftone image that are output because toner is not on a portion of the intermediate transfer belt 17 in which the filming occurs.

In addition, the filming decreases the glossiness of the intermediate transfer belt 17. As a result, the filming that occurs in areas of the intermediate transfer belt 17 facing the optical sensors 40R, 40C, and 40F changes the output signals, and the optical sensors 40R, 40C, and 40F fail to favorably detect the adhesion amounts of the gradation patterns on the intermediate transfer belt 17. Further, the unevenness of the filming makes the output of the optical sensors 40R, 40C, and 40F unstable and hampers correct image adjustment.

The filming may also decrease the cleaning property of the cleaning blade 31. Gradation patterns have relatively large adhesion amounts per unit area and are formed at positions facing the optical sensors 40R, 40C, and 40F. As a result, the cleaning blade 31 receives a large amount of toner at each of positions corresponding to the positions facing the optical sensors 40R, 40C, and 40F. For this reason, the occurrence of filming on areas of the intermediate transfer belt 17 facing the optical sensors 40R, 40C, and 40F is likely to cause cleaning failure (the toner passes through the cleaning area) when the gradation patterns are input to the cleaning blade 31.

The toner staying at an area at which the cleaning blade 31 contacts the surface of the intermediate transfer belt 17, which is referred to as a cleaning area in the following description, scrapes the filming and removes the filming from the surface of the intermediate transfer belt 17. Specifically, the uneven surface of the toner staying at the cleaning area and the pressure of the cleaning blade 31 applied to the toner scrape off the filming from the surface of the intermediate transfer belt 17.

For this reason, the controller 90 in the copier 1 controls the image forming units to form a scraping pattern on the intermediate transfer belt 17 at a given point in time to remove the filming from the intermediate transfer belt 17. The scraping pattern is input to the cleaning blade 31 so that a sufficient amount of toner stays in the cleaning area.

Figure 4:
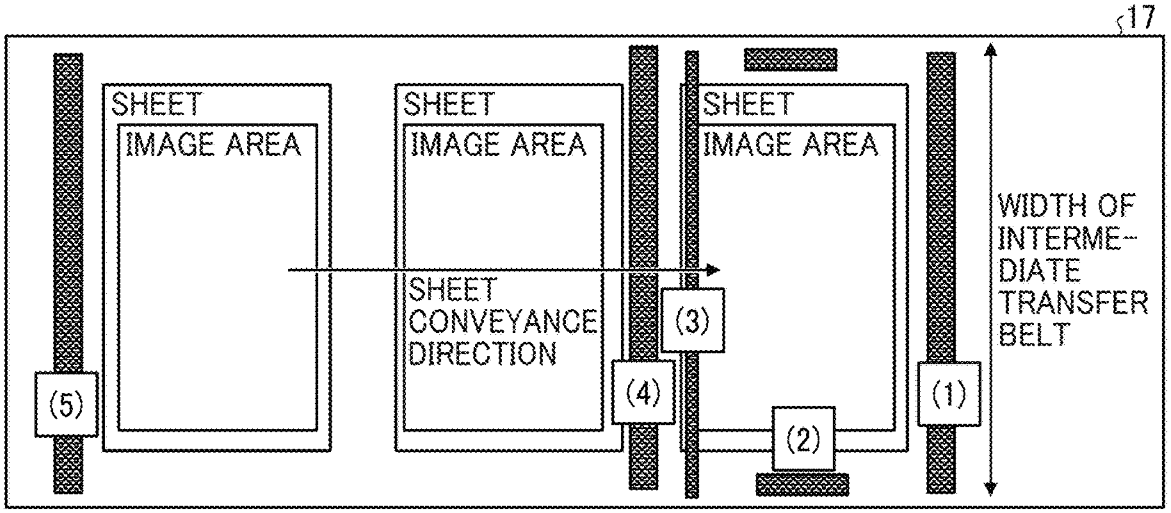
FIG. 4 is a diagram illustrating examples of positions at each of which a scraping pattern is formed on an intermediate transfer belt.

FIG. 4 is a diagram illustrating examples of positions at each of which the scraping pattern is formed on the intermediate transfer belt.

In FIG. 4, the controller 90 continuously performs the typical operations to form and print the images on three sheets. In FIG. 4, "SHEET" means an area on the intermediate transfer belt 17 in which the sheet contacts the intermediate transfer belt 17 at the secondary transfer nip, and "IMAGE AREA" means an area on the intermediate transfer belt 17 that the color image is formed. In the following description, an area between the sheets is referred to as a sheet interval. As illustrated in FIG. 4, the examples of the positions at which the scraping toner patterns are formed include, but are not limited to:

(1) a position before the first sheet enters the secondary transfer nip, (2) a position outside the width of a sheet that passes through the secondary transfer nip, (3) a position in a non-image forming area at a trailing end of a sheet that passes through the secondary transfer nip, (4) a position of the sheet interval, and (5) a position after the last sheet passes through the secondary transfer nip.

In the copier that forms the scraping pattern in the above-described position (2), the width of the intermediate transfer belt is larger than the axial length of the secondary transfer roller, and the secondary transfer roller does not contact the intermediate transfer belt 17 at the above-described position (2). This is because the secondary transfer roller 18 in contact with the intermediate transfer belt 17 at the above-described position (2) transfers the scraping pattern formed at the above-described position (2) onto the surface of the secondary transfer roller 18. Since the scraping pattern formed at the above-described position (2) removes the filming at the end of the intermediate transfer belt in the width direction of the intermediate transfer belt, the scraping pattern having a long band shape extending in the width direction of the intermediate transfer belt is formed at any one of the above-described positions (1) and (3) to (5) to remove the filming at the center of the intermediate transfer belt.

In another embodiment, the position (3) may be a position in a non-image forming area at the leading end of a sheet that passes through the secondary transfer nip. When the scraping patterns formed at the above-described positions (1) and (3) to (5) on the intermediate transfer belt 17 pass through the secondary transfer nip, a positive bias (i.e., a bias having a positive polarity) is applied to the opposed roller 18A. The positive bias applied to the opposed roller 18A electrostatically attracts the scraping pattern to the intermediate transfer belt 17, thus preventing the scraping pattern from being transferred to the secondary transfer roller 18 or the sheet P.

Figure 5:
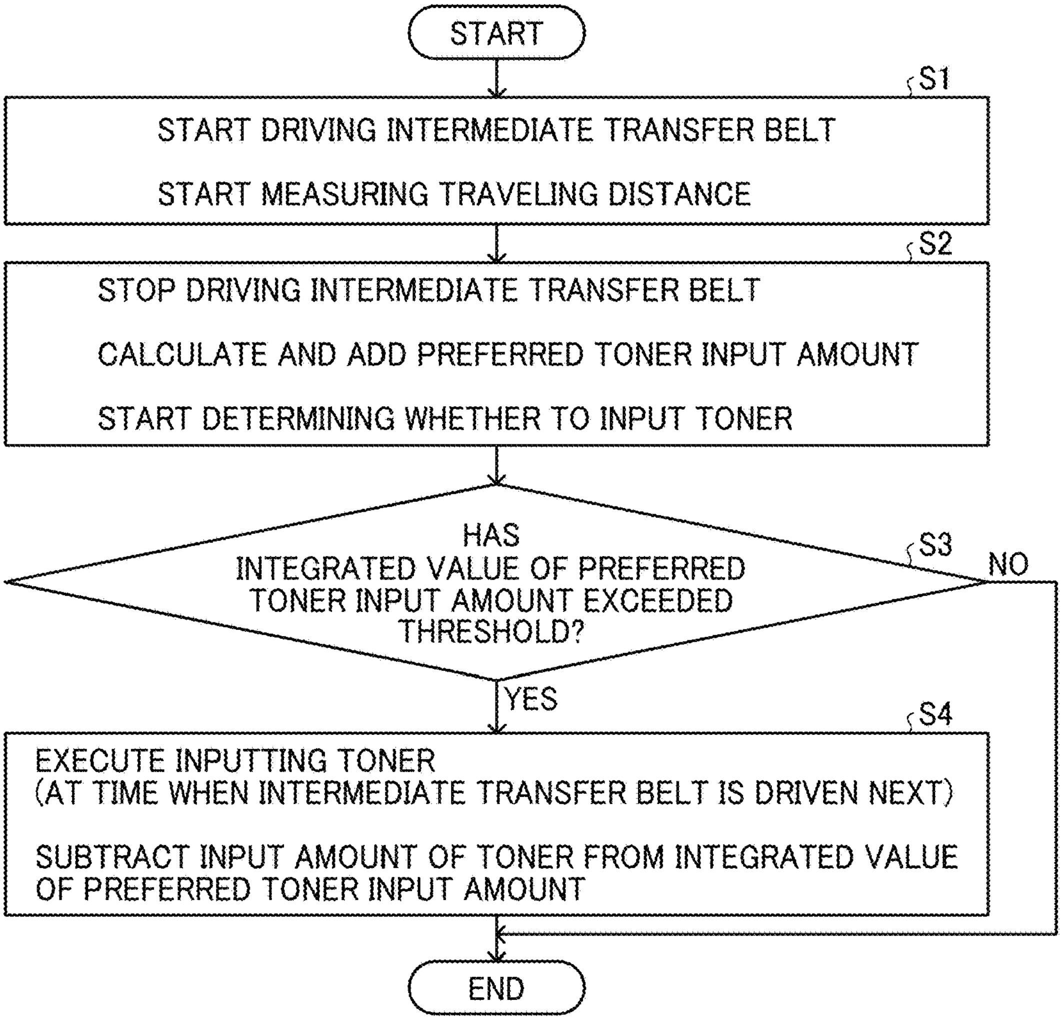
FIG. 5 is a flowchart of a scraping pattern forming process.

FIG. 5 is a flowchart of a scraping pattern forming process.

In step S1, the controller 90 of the copier 1 starts driving the intermediate transfer belt 17 in response to a print command and measuring a traveling distance of the intermediate transfer belt 17. In step S2, the controller stops driving the intermediate transfer belt 17 and calculates, based on the measured traveling distance of the intermediate transfer belt 17, a preferred toner input amount, which is an amount of toner preferred to be input to the cleaning blade 31 based on the state of filming on the outer circumferential surface of the intermediate transfer belt 17. Specifically, the controller multiplies the traveling distance of the intermediate transfer belt 17 by a coefficient, thus calculating the preferred toner input amount. Then, the controller adds the preferred toner input amount thus calculated, to calculate an integrated value of the preferred toner input amount in step S2. In step S3, the controller determines whether the integrated value of the preferred toner input amount exceeds a threshold value. If the integrated value does not exceed the threshold value (No in step S3), the process illustrated in FIG. 5 ends. By contrast, if the integrated value exceeds the threshold value (Yes in step S3), the scraping pattern is formed, for example, during the cleaning operation, which is described below. In step S4, the controller subtracts the amount of toner of the scraping pattern thus formed (i.e., the amount of toner input to the cleaning blade 31) from the integrated value of the preferred toner input amount. Thus, the process illustrated in FIG. 5 ends.

In one type of image forming apparatus, an optical sensor detects whether the filming exists, and the controller determines the timing to form the scraping pattern based on the detected results. In such an image forming apparatus, the filming that occurs outside a detection range of the optical sensor is not removed until the filming occurs in an area facing the optical sensor on the intermediate transfer belt. As a result, such an image forming apparatus may fail to favorably prevent formation of defective images such as an image including white spots that may be caused by the filming.

By contrast, in the present embodiment, the scraping pattern is formed based on the traveling distance of the intermediate transfer belt 17. As a result, the scraping pattern is formed when the filming does not occur in the area facing the optical sensor on the intermediate transfer belt 17 but is likely to occur in an area other than the area facing the optical sensor. Accordingly, the copier 1 favorably removes the filming from the intermediate transfer belt 17, as compared with the above-described image forming apparatus that forms the scraping pattern based on a result of detection performed by the optical sensor.

The coefficient may be a fixed value. Alternatively, the coefficient may be variable between a color image mode and a monochrome image mode. This is because the filming may be worse in the color image mode than in the monochrome image mode. The internal temperature of the copier 1 tends to be higher in the color image mode than in the monochrome image mode because the fixing temperature in the color image mode is set to be higher than that in the monochrome mode, and because the number of operating motors in the color image mode is greater than that in the monochrome image mode. An increase in the internal temperature may also increase the stick-slip amount of the cleaning blade 31 and worsen the filming. In addition, the copier 1 includes the lubricant application device to apply lubricant to the surface of the photoconductor drums 11Y, 11M, 11C, and 11BK. Accordingly, an amount of lubricant applied to the intermediate transfer belt 17 in the color image mode is greater than an amount of lubricant applied to the intermediate transfer belt 17 in the monochrome image mode. The lubricant includes components of the filming adhered to the intermediate transfer belt 17. For this reason, the filming may be worse in the color image mode than in the monochrome image mode.

To prevent such a situation, for example, a coefficient to calculate the preferred toner input amount is set, and a coefficient B of the color image mode is set to a value higher than a coefficient A of the monochrome image mode (A<B). Then, at the time of image formation (or at the time of driving the intermediate transfer belt 17), the controller determines whether the mode is the monochrome image mode or the color image mode. The controller calculates the preferred toner input amount with the coefficient A in the monochrome image mode; whereas the controller calculates the preferred toner input amount with the coefficient B in the color image mode.

For example, when images are more frequently formed in the color image mode than in the monochrome image mode, the filming is more likely to be worse than in the monochrome image mode as described above. However, when images are more frequently formed in the color image mode than in the monochrome image mode, the scraping toner pattern is formed earlier than in the monochrome image mode because the integrated value of the preferred toner input amount exceeds the threshold value with a relatively short traveling distance of the intermediate transfer belt 17. By contrast, when images are more frequently formed in the monochrome image mode than in the color image mode, the filming is less likely to be worse than in the color image mode. In other words, when images are more frequently formed in the monochrome image mode than in the color image mode, the scraping toner pattern is formed later than in the color image mode because the integrated value of the preferred toner input amount exceeds the threshold value with a longer traveling distance of the intermediate transfer belt 17 in the monochrome image mode than in the color image mode.

Since the scraping pattern is formed based on the image mode, the scraping pattern is formed at an appropriate point in time, thus favorably preventing wasteful toner consumption and the filming from being worse.

The developing device 13 may continuously supply background fog toner to each photoconductor drum during the operation of the copier 1, and the background fog toner may adhere to the sheet interval on the intermediate transfer belt 17. The background fog toner adhered to the sheet interval on the intermediate transfer belt 17 adheres to the secondary transfer roller at the secondary transfer nip. As a result, the secondary transfer roller 18 is contaminated with the toner. The toner adhered to the secondary transfer roller 18 may be adhered to the backside of the sheet P while the toner image is transferred to the sheet P, which may cause backside contamination.

To countermeasure the backside contamination, the controller 90 in the copier 1 is configured to execute a cleaning operation to clean the secondary transfer roller 18. Executing the cleaning operation moves the toner adhered to the secondary transfer roller 18 to the intermediate transfer belt 17.

Figure 6:
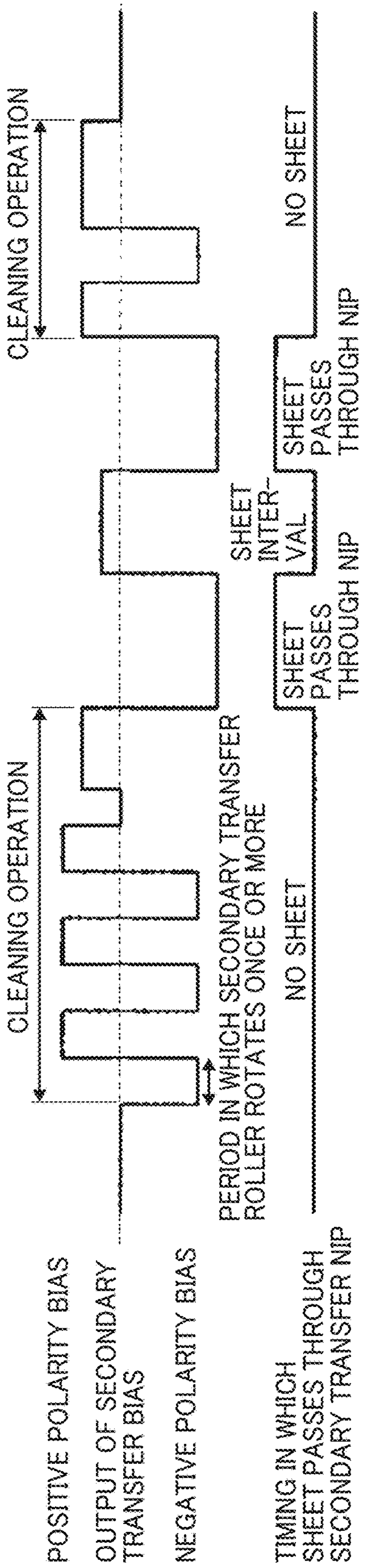
FIG. 6 is a timing chart of an example of a cleaning operation.

FIG. 6 is a timing chart of an example of the cleaning operation. In FIG. 6, "SHEET INTERVAL" means a time in which the sheet interval on the intermediate transfer belt contacts the secondary transfer roller 18.

As illustrated in FIG. 6, the controller 90 controls the power source 18B to alternately apply a negative polarity bias and a positive polarity bias to the opposed roller 18A while the controller 90 executes the cleaning operation, forming an alternating electric field in the secondary transfer nip. Forming the alternating electric field causes a hopping effect that can efficiently clean the toner adhered to the secondary transfer roller 18. The hopping effect is an effect that facilitates the movement of the toner on the secondary transfer roller 18 to the intermediate transfer belt 17 by the reciprocation of the toner between the secondary transfer roller 18 and the intermediate transfer belt 17. Forming the alternating electric field as described above can move both the toner having the positive charge and the toner having the negative charge that are adhered to the secondary transfer roller 18 to the intermediate transfer belt 17, and the surface of the secondary transfer roller 18 can be cleaned well. As a result, the backside contamination of the sheet can be prevented.

Each of the period in which the negative polarity bias is applied to the secondary transfer roller 18 and the period in which the positive polarity bias is applied to the secondary transfer roller 18 is equal to or longer than a period in which the secondary transfer roller 18 rotates once. In FIG. 6, during the cleaning operation performed before the first sheet passes through the secondary transfer nip, the controller 90 controls the power source 18B to alternately apply the negative bias and the positive bias three times to the oppose roller 18A, subsequently, temporarily set to zero, and apply the positive bias to the opposed roller 18A again. The period in which the positive bias is applied again is adjusted by the timing of the sheet feeding. The bias may not be temporarily set to zero.

As in the cleaning operation performed after the last sheet passes through the secondary transfer nip in FIG. 6, the cleaning operation may apply the negative bias and the positive bias once, or four times or more. The bias values of the negative bias and the positive bias in the first and second times of application may not be constant (the bias may be amplified or attenuated in a stepwise manner). If the sheet interval is wide, the cleaning operation may be executed in the sheet interval.

It is preferable that the sufficient amount of toner staying in the cleaning area can favorably remove the filming on the surface of the intermediate transfer belt 17 as described above. However, increasing the toner amount of the scraping pattern and inputting a large amount of toner to the cleaning area at a time causes the toner to pass through the cleaning blade, which may cause cleaning failure.

The copier in the present embodiment has multiple image forming modes in which the intermediate transfer belt 17 is moved at different multiple speeds, such as a standard speed, a medium speed, and a low speed. Specifically, the copier includes a motor that can drive the intermediate transfer belt 17 as the image bearer at different multiple speeds. The controller 90 is configured to switch the image forming mode according to the type of paper, the installation environment of the image forming apparatus, and the usage state of the customer and control the motor to drive the intermediate transfer belt at one of the speeds corresponding to the image forming mode.

In the standard speed image forming mode, the intermediate transfer belt 17 is moved by the fastest linear speed to enhance productivity, but the fastest linear speed is likely to worsen the filming. In order to remove the filming on the intermediate transfer belt 17 well, the amount of toner input to the cleaning area in the standard speed image forming mode is designed to be larger than the amount of toner input to the cleaning area in the medium speed image forming mode or the low speed image forming mode.

However, increasing the toner amount of the scraping pattern and inputting a large amount of toner to the cleaning area at a time causes the cleaning failure.

Figure 7A:
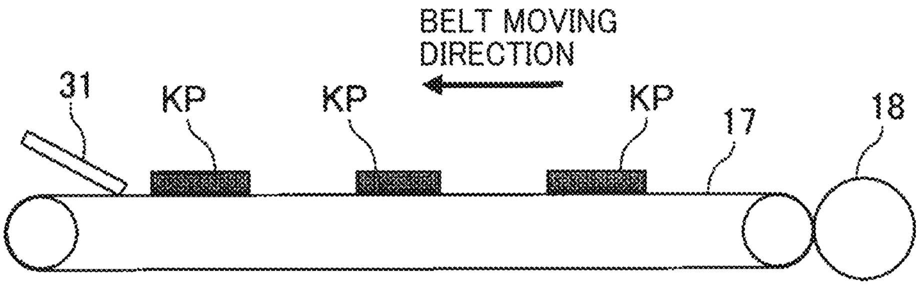
FIGS. 7A and 7B are schematic diagrams illustrating how scraping patterns are formed.
Figure 7B:
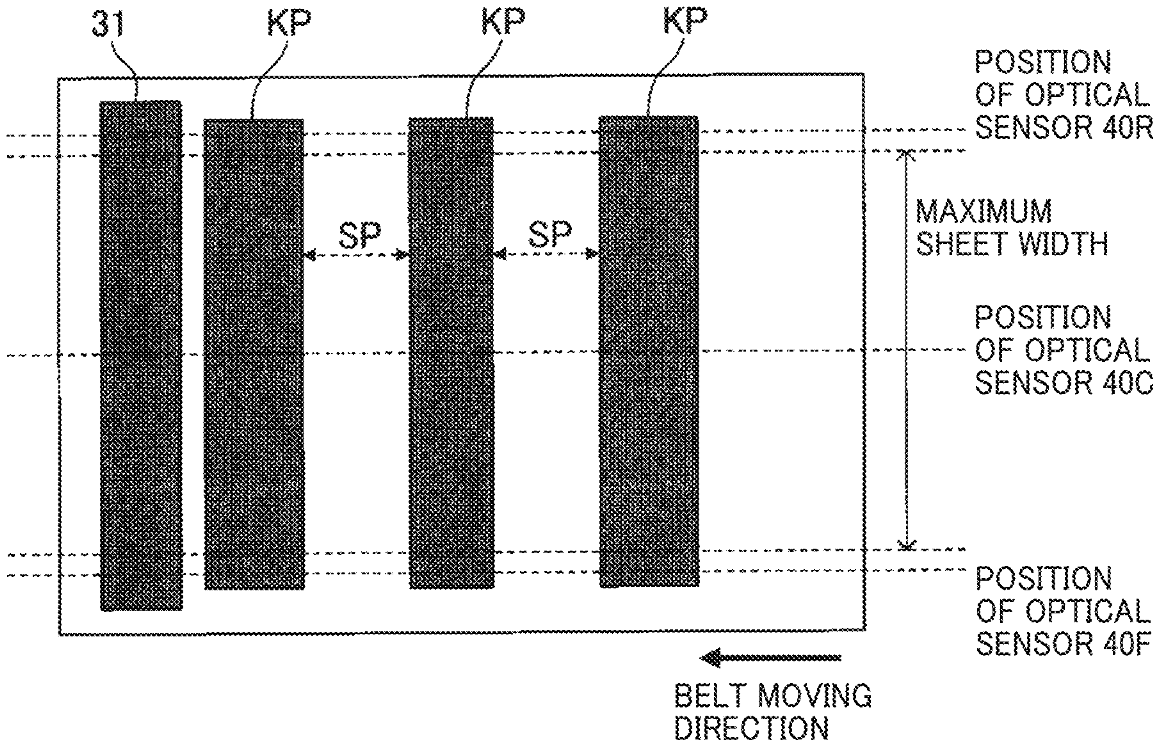

To address such a situation, the copier 1 in the present embodiment forms multiple scraping patterns KP at short intervals Sp as illustrated in FIGS. 7A and 7B. Thus, the amount of toner in the scraping pattern KP is set so as not to cause the cleaning failure, and the number of the scraping patterns KP is set so as to obtain the amount of toner that can satisfactorily remove the filming on the intermediate transfer belt.

As illustrated in FIG. 7B, each of the scraping patterns KP has a long band shape extending in the main scanning direction and is longer than the maximum sheet width that is the largest width of widths of sheets that can be conveyed by the copier 1. The copier 1 includes the optical sensors 40R and 40F that are disposed to face both ends of the intermediate transfer belt 17 in the direction orthogonal to the belt moving direction. The scraping pattern KP includes the areas of the intermediate transfer belt 17 facing the optical sensors 40R and 40F. The above-described configuration can satisfactorily remove the filming on the maximum sheet width region of the intermediate transfer belt 17 in which the toner image to be transferred to the sheet P is formed and prevent the occurrence of the abnormal image such as the white spot. In addition, the scraping pattern KP includes the areas of the intermediate transfer belt 17 facing the optical sensors 40R and 40F that are disposed to face both ends of the intermediate transfer belt 17. As a result, the cleaning blade can satisfactorily remove the filming on the areas of the intermediate transfer belt 17 facing the optical sensors 40R and 40F, and the optical sensors 40R and 40F can satisfactorily detect amounts of toner adhered to both ends of the intermediate transfer belt 17.

The interval Sp is set so that the next scraping pattern is input to the cleaning area before the toner that has formed the preceding scraping pattern is completely removed from the cleaning area. The interval Sp is also set so that the amount of toner staying in the cleaning area is less than the amount of toner that causes the cleaning failure when the next scraping pattern KP is input to the cleaning area. As a result, the cleaning failure is prevented, and the filming is satisfactorily removed.

Figure 8A:
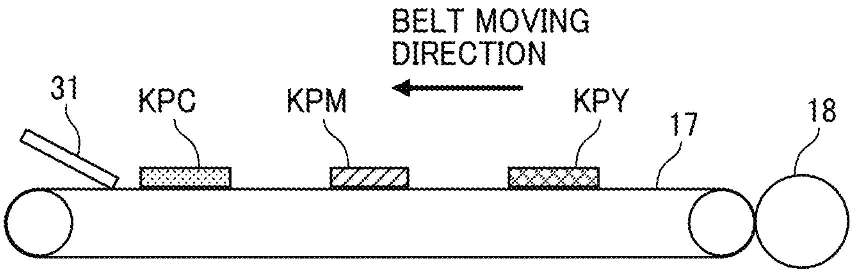
FIGS. 8A and 8B are schematic diagrams illustrating an example in which three scraping patterns are formed in different colors.
Figure 8B:
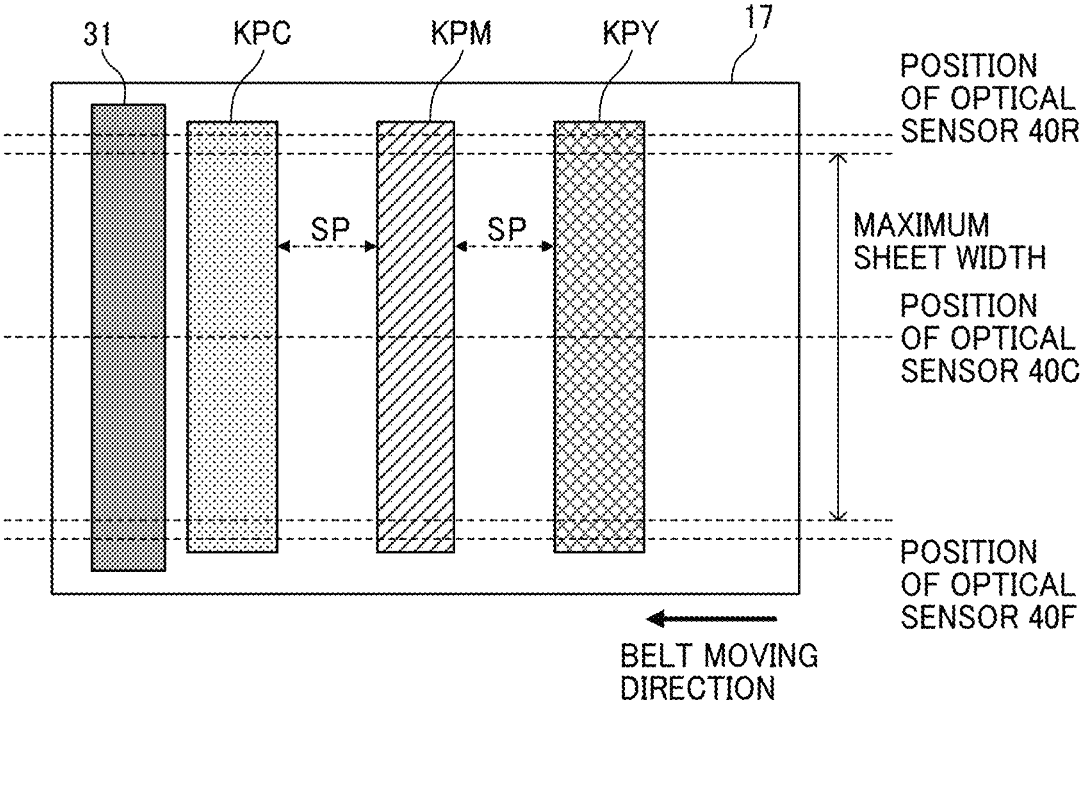

Preferably, the three scraping patterns are formed by different color toners as illustrated in FIGS. 8A and 8B. Forming scraping patterns with different color toners prevents the specific color toner from being consumed.

In FIGS. 8A and 8B, the scraping pattern located on the most downstream portion of the intermediate transfer belt 17 in the belt moving direction is formed by the cyan toner, the center scraping pattern of the three scraping patterns is formed by the magenta toner, and the scraping pattern located on the most upstream portion of the intermediate transfer belt 17 in the belt moving direction is formed by the yellow toner, which follows the order in which the image forming units 10 successively arranged as illustrated in FIG. 1 forms the cyan toner image, magenta toner image, and the yellow toner image. The above-described order of the colors of the scraping patterns following the order in which the image forming units 10 successively arranged form the color toner images can shorten a time to form the three scraping patterns. Alternatively, three scraping patterns may be formed on the intermediate transfer belt 17 in the order of a black toner pattern, a cyan toner pattern, and a magenta toner pattern. The above-described configuration can shorten a time to form the three scraping patterns including the black toner pattern, the cyan toner pattern, and the magenta toner pattern. For example, the time to form the three scraping patterns including the black toner pattern, the cyan toner pattern, and the magenta toner pattern is shorter than a time to form three scraping patterns including a black toner pattern, a magenta toner pattern, and a yellow toner pattern and not including the cyan toner pattern. The time to form the three scraping patterns is defined as a time from when one of the three image forming units starts the series of image forming processes to when the last one of the three image forming units finishes the series of image forming processes.

Forming the multiple scraping patterns at short intervals as illustrated in FIGS. 7A to 8B can prevent the occurrence of the cleaning failure and satisfactorily remove filming in the standard speed image forming mode that is likely to increase the filming. However, the amount of filming in each of the middle-speed and low-speed image forming modes is smaller than the amount of filming in the standard speed image forming mode because the linear speed of the intermediate transfer belt 17 in each of the middle-speed and low-speed image forming modes is slower than that in the standard-speed image forming mode. Therefore, forming the multiple scraping patterns KP as illustrated in FIGS. 7A to 8B in the middle-speed and low-speed image forming modes inputs an excessive amount of toner larger than the amount of toner to remove the filming to the cleaning area. The toner consumption amount is uselessly increased. Preferably, the number of scraping patterns KP in the middle-speed and low-speed image forming modes is set to be smaller than that in the standard-speed image forming mode.

Figure 9:
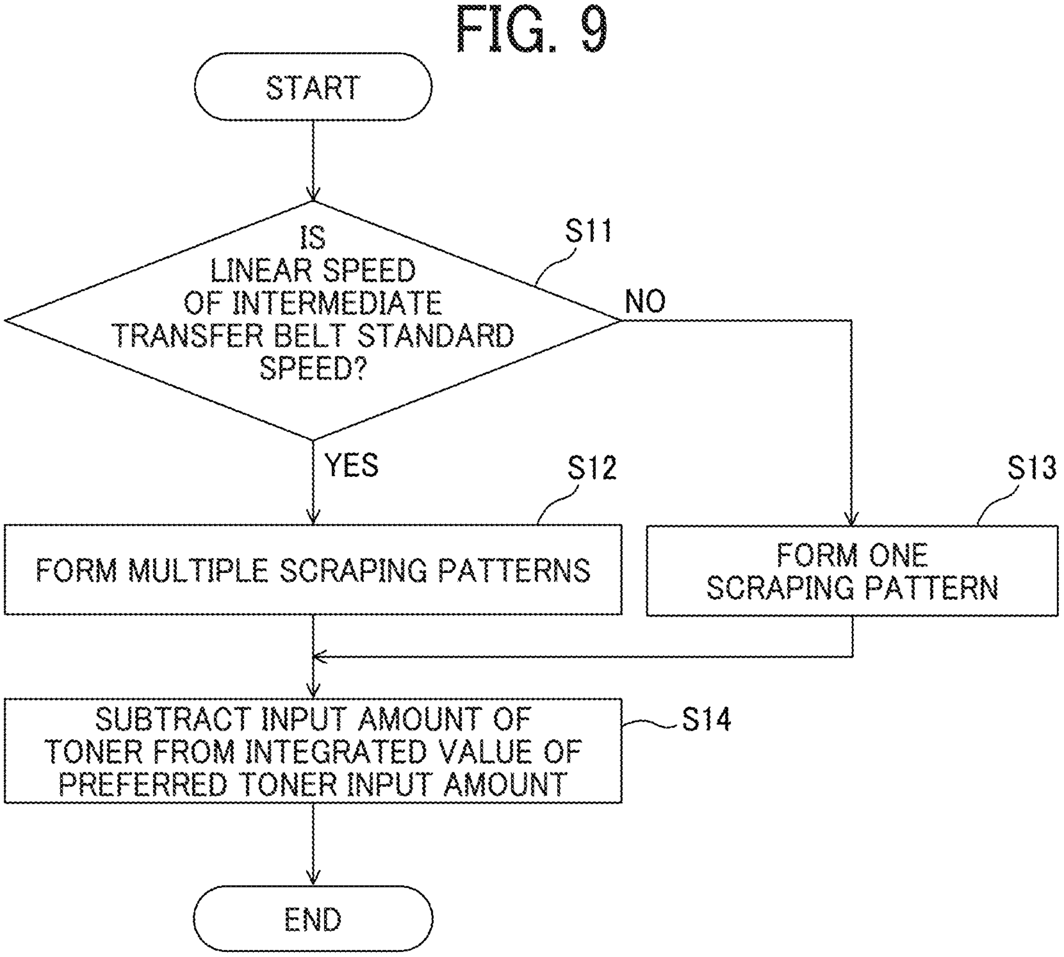
FIG. 9 is a flowchart of a scraping pattern forming process according to an embodiment of the present disclosure.

FIG. 9 is a flowchart of a scraping pattern forming process in the present embodiment.

As described with reference to FIG. 5, when the integrated value of the preferred toner input amount exceeds the threshold value, that is, at the timing for forming the scraping pattern, the controller 90 determines whether the linear speed of the intermediate transfer belt 17 is the standard speed in step S11. If the image forming mode is the standard speed image forming mode in which the linear speed of the intermediate transfer belt 17 is set to the standard speed that is the relatively high speed (Yes in step S11), the controller 90 controls the image forming units to form the multiple scraping patterns at short intervals as illustrated in FIGS. 7A to 8B in step S12.

If the image forming mode is the medium speed or low speed image forming mode in which the linear speed of the intermediate transfer belt 17 is set to the medium speed or low speed (No in step S11), the controller 90 controls the image forming unit to form one scraping pattern KP in step S13. Subsequently, the controller 90 subtracts the amount of toner of the scraping pattern thus formed (i.e., the amount of toner input to the cleaning blade) from the integrated value in step S14.

As described above, the controller 90 forms one scraping pattern in the medium-speed and low-speed image forming modes because the filming in the medium-speed and low-speed image forming modes is formed slower than in the standard-speed image forming mode. Forming the one scraping pattern reduces the amount of toner input to the cleaning area but can satisfactorily remove the filming on the intermediate transfer belt 7. This can decrease wasteful toner consumption.

As described with reference to FIG. 5, the controller 90 determines forming the scraping pattern when the integrated value of the preferred toner input amount exceeds the threshold value. The threshold value in the standard-speed image forming mode may be different from the threshold value in each of the medium-speed and low-speed image forming modes. Specifically, the threshold value in the standard-speed image forming mode may be set to be smaller than the threshold value in each of the medium-speed and low-speed image forming modes. The scraping pattern in the standard-speed image forming mode may be more frequently formed than that in each of the medium-speed and low-speed image forming modes.

As described with reference to FIG. 5, the controller multiplies the traveling distance of the intermediate transfer belt 17 by a coefficient, thus calculating the preferred toner input amount. The coefficient in the standard-speed image forming mode may be changed from the coefficient in each of the medium-speed and low-speed image forming modes. Specifically, the coefficient in the standard-speed image forming mode may be set to be larger than the coefficient value in each of the medium-speed and low-speed image forming modes. As a result, the scraping pattern in the standard-speed image forming mode is more frequently formed than that in each of the medium-speed and low-speed image forming modes, which prevents the filming in the standard-speed image forming mode from causing the above-described disadvantages.

The following describes verification experiments conducted by the inventors.

As illustrated in FIGS. 10A to 10F, the inventors performed verification experiments under conditions (A) to (F) in which the length of the scraping pattern in the belt moving direction and the number of scraping patterns were different from each other.

Figure 10A:
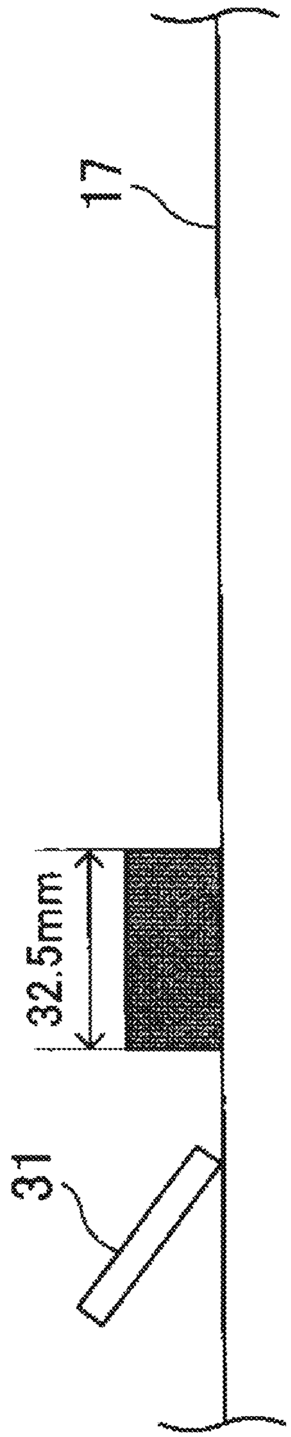
FIGS. 10A to 10F are schematic diagrams illustrating scraping pattern conditions that are six conditions.
Figure 10B:
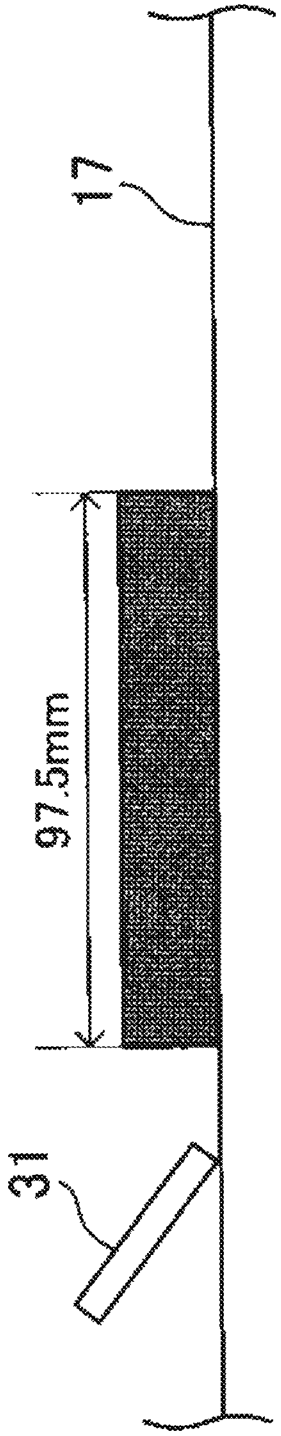
Figure 10C:
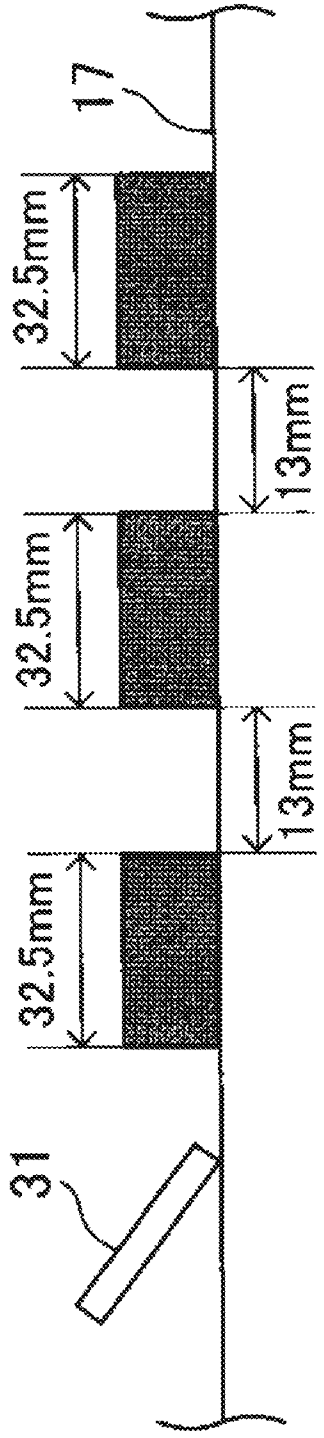
Figure 10D:
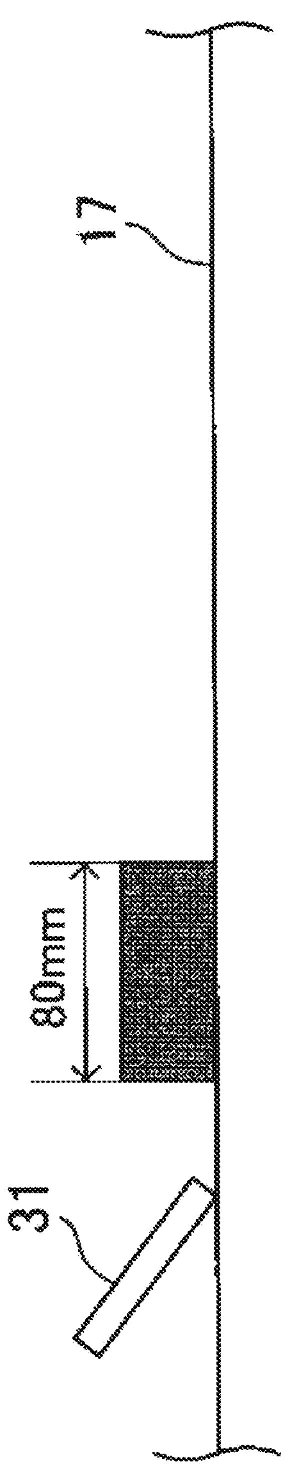
Figure 10E:
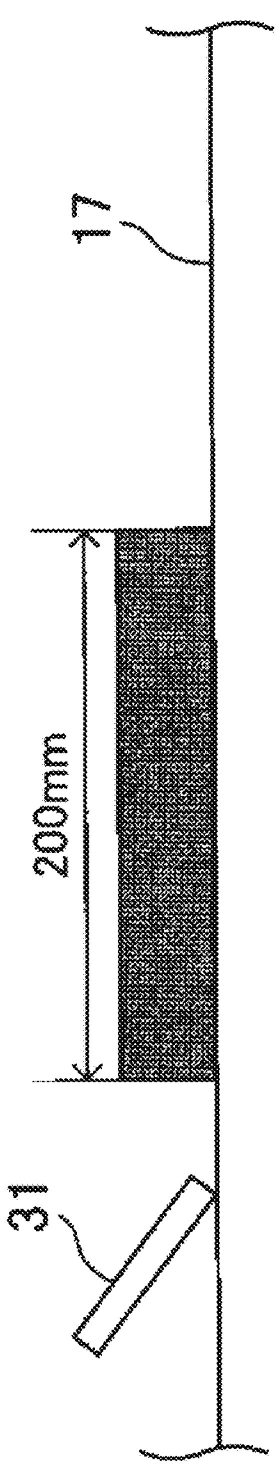
Figure 10F:
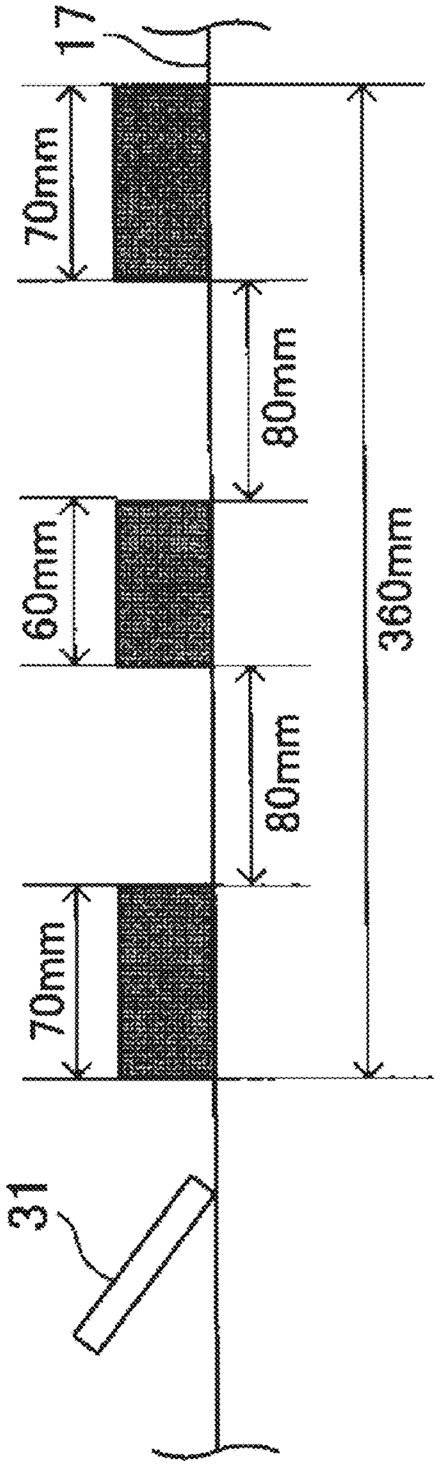

In the condition (A), one scraping pattern KP having a length of 32.5 mm in the belt moving direction was formed as illustrated in FIG. 10A. In the condition (B), one scraping pattern KP having a length of 97.5 mm in the belt moving direction was formed as illustrated in FIG. 10B. In the condition (C), three scraping patterns KP each having a length of 32.5 mm in the belt moving direction were formed at an interval of 13 mm as illustrated in FIG. 10C. In the condition (D), one scraping pattern KP having a length of 80 mm in the belt moving direction was formed as illustrated in FIG. 10D. In the condition (E), one scraping pattern KP having the length of 200 mm in the belt moving direction was formed as illustrated in FIG. 10E. In the condition (F), three scraping patterns KP having lengths of 70 mm, 60 mm, and 70 mm, respectively in the belt moving direction were formed at an interval of 80 mm as illustrated in FIG. 10F. Under the conditions (A) to (F), the cleaning performance and the filming were evaluated for two levels of the linear speed of the intermediate transfer belt, i.e., 300 mm/s as the standard speed and 256 mm/s as the medium speed.

The cleaning performance was evaluated as follows.

A cleaning blade contact pressure was set to be 20 N/m.

The linear speed of the intermediate transfer belt was set to be two levels of 300 mm/s and 256 mm/s.

The cleaning performance was evaluated based on an image printed after the scraping pattern KP was formed in each of the above-described linear speeds of the intermediate transfer belt. When the abnormal image due to the cleaning failure that is streaks was not found in the printed image, the cleaning performance was evaluated as good. When the abnormal image due to the cleaning failure that is streaks was found in the printed image, the cleaning performance was evaluated as poor.

The filming was evaluated as follows.

The copier printed the same images each having an image area rate of 5% on 150,000 sheets and formed test patterns on the intermediate transfer belt. The optical sensors 40R, 40C, and 40F detected amounts of toner in the test patterns. The filming hampers the optical sensor from normally detecting the amount of toner, and an error message is displayed on an operation panel. If the error message was not displayed when the optical sensors 40R, 40C, and 40F detected the amounts of toner in the test patterns, the filming was evaluated as "No problem." If the error message was displayed when the optical sensors 40R, 40C, and 40F detected the amounts of toner in the test patterns, the filming was evaluated as "Bad." The controller calculated the preferred toner input amount based on the travel distance of the intermediate transfer belt 17 and the integrated value of the preferred toner input amount. After the integrated value exceeded the threshold value, the scraped pattern was formed.

The results of the verification experiments are illustrated in Table 1 below. In addition to the above conditions, under the condition (0) in Table 1 below, the verification experiments were performed. In the condition (0), the scraping pattern KP was not formed.

TABLE 1

| CONDITION | PATTERN |
|---|---|
| 0 | NO PATTERN |
| A | ONE PATTERN HAVING A LENGTH OF 32.5 mm (SEE FIG. 10A) |
| B | ONE PATTERN HAVING A LENGTH OF 97.5 mm (SEE FIG. 10B) |
| C | THREE PATTERNS EACH HAVING A LENGTH OF 32.5 mm AND ARRANGED AT AN INTERVAL 13 mm (SEE FIG. 10C) |

TABLE 1-continued

| | |
|---|---|
| D | ONE PATTERN HAVING A LENGTH OF 80 mm (SEE FIG. 10D) |
| E | ONE PATTERN HAVING A LENGTH OF 200 mm (SEE FIG. 10E) |
| F | THREE PATTERNS HAVING LENGTHS, 70 mm, 60 mm, AND 70 mm, AND ARRANGED AT AN INTERVAL 80 mm (SEE FIG. 10F) |

| | LINEAR SPEED | | | |
|---|---|---|---|---|
| | 256 mm/s | | 300 mm/s | |
| CONDITION | CLEANING PERFORMANCE | FILMING | CLEANING PERFORMANCE | FILMING |
| 0 | GOOD | BAD | GOOD | BAD |
| A | GOOD | NO PROBLEM | GOOD | BAD |
| B | POOR | NO PROBLEM | POOR | NO PROBLEM |
| C | GOOD | NO PROBLEM | GOOD | NO PROBLEM |
| D | GOOD | NO PROBLEM | GOOD | BAD |
| E | POOR | NO PROBLEM | POOR | NO PROBLEM |
| F | GOOD | NO PROBLEM | GOOD | NO PROBLEM |

As illustrated in Table 1, the cleaning performance was evaluated as "Poor" under each of the conditions (B) and (E) in which one scraping pattern KP having the length of 97.5 mm or more in the belt moving direction was formed in both cases of the linear speed 256 mm/s and 300 mm/s of the intermediate transfer belt 17. The present inventors consider that this is because a large amount of toner was input to the cleaning area at a time, and thus the tip of the cleaning blade 31 could not withstand the pressure of the toner input to the cleaning area. As a result, the toner slipped through the tip of the cleaning blade 31, and thus the streaky abnormal image was generated.

In contrast, under the conditions (A), (C), (D), and (F) in which the lengths of the scraping patterns KP in the belt moving direction are equal to or smaller than 80 mm, the cleaning failure did not occur. Based on the above, it was found that setting the length of the scraping pattern KP in the belt moving direction to be equal to or smaller than 80 mm can set the amount of toner of the scraping pattern KP that is less than the amount of toner at which the cleaning failure occurs.

Under the conditions (B) and (E), the filming was evaluated as "No problem" in both cases of the linear speed 256 mm/s and 300 mm/s of the intermediate transfer belt 17. Inputting a large amount of toner to the cleaning blade 31 causes the toner to stay in the cleaning area for a long time. The toner staying in the cleaning area removes the filming continuously for a certain long time. As a result, it is considered that the filming on the intermediate transfer belt 17 can be prevented over time, which results in the filming evaluation of "No problem".

As illustrated in Table 1, when the linear speed of the intermediate transfer belt 17 was 256 mm/s, the filming evaluation was "No problem" under the conditions (A) to (F). In contrast, when the linear speed of the intermediate transfer belt 17 was 300 mm/s, the filming evaluation was "Bad" under the conditions (1) and (4) that form one scraping pattern.

In the present embodiment, the amount of toner of the formed scraping pattern (in other words, the amount of toner input to the cleaning blade) is subtracted from the integrated value of the toner input amount, and the scraping pattern is formed after the integrated value of the toner input amount exceeds the threshold value as described above. Since the amount of toner input to the cleaning blade 31 is small in the condition (A), the subtracted value is small. As a result, the scraping patterns are more frequently formed in the condition (A) than in the other conditions (B) to (F). However, since the amount of toner input to the cleaning blade in one operation of forming the scraping pattern is small, one operation of forming the scraping pattern is not enough to scrape the filming. As a result, it is considered that the scraping patterns are frequently formed but cannot satisfactorily remove the filming from the intermediate transfer belt 17 under the condition of the linear speed of 300 mm/s that is likely to increase the filming, and the filming of the intermediate transfer belt 17 increases with the lapse of time, so that the filming evaluation is "Bad".

On the other hand, when the linear speed of the intermediate transfer belt 17 was 256 mm/s, the filming was evaluated as "no problem" even under the condition (A) forming the smallest amount of toner input to the cleaning blade in one scraping pattern forming operation among the conditions (A) to (F).

When the linear speed of the intermediate transfer belt 17 was 300 mm/s under the conditions (C) and (F), the cleaning performance was evaluated as "Good," and the filming was evaluated as "No problem." Under each of the conditions (C) and (F), the length of the scraping pattern KP in the belt moving direction is equal to or smaller than 80 mm, which limits the amount of toner of the scraping pattern KP to be less than the amount of toner at which the cleaning failure occurs, and thus the cleaning failure does not occur.

In addition, under each of the conditions (C) and (F), three scraping patterns are formed at predetermined intervals. Before the cleaning blade 31 completely removes the toner in the cleaning area, the next scraping pattern KP is input to the cleaning area. Thus, the toner at the cleaning area continues to scrape the filming. In the condition (C), the sum of the lengths of the three scraping patterns in the belt moving direction is 97.5 mm, which is the same as that in the condition (B). As a result, the amount of toner input to the cleaning area in the condition (C) is the same as that in the condition (B). Similar to the condition (B), the toner staying at the cleaning area can remove the filming on the intermediate transfer belt 17 continuously for a certain long time. As a result, it is considered that the filming evaluation was "No problem" even in the case of the linear speed 300 mm/s of the intermediate transfer belt 17 that is likely to increase the filming.

Regarding the condition (F), the length of each scraping pattern in the belt moving direction is longer than that in the condition (C). Therefore, the amount of toner input to the cleaning area at a time in the condition (F) is larger than that in the condition (C). For this reason, although the interval at which the scraping patterns are formed in the condition (F) is longer than that in the condition (C), the next scraping pattern KP is input to the cleaning area before the cleaning blade 31 completely removes the toner in the cleaning area. In the condition (F), the toner staying in the cleaning area can remove the filming on the intermediate transfer belt 17 continuously for a certain long time. As a result, it is considered that the evaluation was "No problem" even in the case of the linear speed 300 mm/s of the intermediate transfer belt 17.

On the other hand, setting the interval between the scraping patterns in the condition (F) to be 13 mm as in the condition (C) increases the amount of toner staying in the cleaning area to an excessive amount, which may cause cleaning failure. Accordingly, the interval between the scraping patterns is set in accordance with the length of each scraping pattern in the belt moving direction (in other words, the amount of toner in the scraping pattern).

In the condition (C), the distance from the first scraping pattern to the last scraping pattern is shorter than that in the condition (F). This means that the period of the scraping pattern forming operation in the condition (C) is shorter than that in the condition (F), which shortens the downtime of the image forming apparatus. On the other hand, the total amount of toner input to the cleaning area by one scraping pattern forming operation in the condition (F) is larger than that in the condition (C), and the time during which the toner stays at the cleaning area in the condition (F) is longer than that in the condition (C). This means that the filming removal effect in the condition (F) is higher than that in the condition (C).

As described above, based on the results in the conditions (A), (B), (D), and (E), the present inventors found that setting at least the length of the scraping pattern KP in the belt moving direction to be equal to or smaller than 80 mm can set the amount of toner of the scraping patterns KP to be smaller than the amount of toner at which the cleaning failure occurs and prevent the occurrence of the cleaning failure.

In addition, the present inventors found that setting the length of the scraping pattern KP in the belt moving direction to be equal to or longer than 97.5 mm can prevent the occurrence of the disadvantage caused by the filming on the intermediate transfer belt 17 over time when the linear speed of the intermediate transfer belt 17 was 300 mm/s in the standard-speed image forming mode. Based on the results in the conditions (C) and (F), the present inventors found that forming multiple scraping patterns at short intervals to set the sum of the lengths of the scraping patterns KP to be equal to or longer than 97.5 mm can prevent the occurrence of the cleaning failure and the disadvantage caused by the filming when the linear speed of the intermediate transfer belt 17 was 300 mm/s in the standard-speed image forming mode.

On the other hand, in the image forming mode with the linear speed of the intermediate transfer belt 17 slower than that in the standard-speed image forming mode that is 256 mm/s, the present inventors found that setting the length of the scraping pattern KP in the belt moving direction to be equal to or longer than 32.5 mm can prevent the occurrence of the disadvantage caused by the filming. In other words, the present inventors found that forming the one scraping pattern KP having the length of 32.5 mm in the belt moving direction can prevent the occurrence of the disadvantage caused by the filming and avoid the wasteful toner consumption in the middle-speed and low-speed image forming modes in which the linear speed of the intermediate transfer belt is equal to or slower than 256 mm/s.

As described above, when the linear speed of the intermediate transfer belt requires the length of the scraping pattern in the belt moving direction exceeding 80 mm to prevent the occurrence of the disadvantage caused by the filming over time, multiple scraping patterns are formed. As a result, the cleaning failure is prevented, and the filming is satisfactorily removed over time.

On the other hand, when the linear speed of the intermediate transfer belt allows the length of the scraping pattern in the belt moving direction to be equal to or shorter than 80 mm to prevent the occurrence of the disadvantage caused by the filming over time, the one scraping pattern is formed, and the length of the scraping pattern in the belt moving direction is set in accordance with the linear speed of the intermediate transfer belt. As a result, the cleaning failure is prevented, the filming is removed over time, and the wasteful toner consumption is avoided.

Based on the results in the above verification experiments, the controller controls the image forming units to form the multiple scraping patterns in the standard-speed image forming mode as illustrated in FIG. 9. On the other hand, in the medium-speed and low-speed image forming modes, the controller controls the image forming units to form the one scraping pattern. The above-described control can avoid the wasteful toner consumption and, in addition, prevent the cleaning failure and the occurrence of the disadvantage caused by the filming over time.

Preferably, multiple scraping patterns KP are formed to have the length of the scraping pattern KP that is shorter than the circumferential length of the secondary transfer roller 18 and the interval Sp between the scraping patterns KP that is longer than the circumferential length of the secondary transfer roller 18.

As described above, while the scraping pattern KP passes through the secondary transfer nip, the controller 90 controls the power source 18B to apply the bias having the positive polarity to the opposed roller 18A. As a result, the toner having the negative polarity is electrostatically attracted to the intermediate transfer belt 17 and is prevented from moving to the secondary transfer roller 18. However, the scraping pattern may include the reversely charged toner having the positive polarity, and the reversely charged toner may electrostatically move to the secondary transfer roller 18. In addition, the surface layer of the secondary transfer roller 18 is made of foamed material such as sponge and includes many minute cells. The secondary transfer roller 18 may scrape the normally charged toner having the negative polarity at the secondary transfer nip, and the normally charged toner may adhere to the secondary transfer roller 18.

If the length of the scraping pattern KP in the belt moving direction is equal to or longer than the circumferential length of the secondary transfer roller 18, a part of the secondary transfer roller 18 that has come into contact with the scraping pattern KP at the secondary transfer nip comes into contact with the scraping pattern again after one rotation of the secondary transfer roller. In other words, the part of the secondary transfer roller 18 continuously contacts the scraping pattern KP and is contaminated by the toner of the scraping pattern. As a result, the contamination of the part contacting the scraping pattern twice may be worse than another part of the secondary transfer roller 18.

Even if the length of the scraping pattern KP in the belt moving direction is shorter than the circumferential length of the secondary transfer roller 18, setting the interval Sp between the scraping patterns KP to be shorter than the circumferential length of the secondary transfer roller 18 generates the part of the secondary transfer roller 18 continuously contacting the scraping pattern. As a result, the toner contamination at the part may be worse than that at another part.

Setting the length of the scraping pattern KP in the belt moving direction to be shorter than the circumferential length of the secondary transfer roller 18 and setting the interval Sp between the scraping patterns KP to be longer than the circumferential length of the secondary transfer roller 18 can prevent the secondary transfer roller 18 from generating the part continuously contacting the scraping pattern KP.

In the above-described configuration, the part of the secondary transfer roller 18 that has come into contact with the scraping pattern KP at the secondary transfer nip comes into contact with the intermediate transfer belt 17 after one rotation, and a part of the toner that has adhered to the secondary transfer roller 18 at the time of contact with the scraping pattern KP can be transferred to the intermediate transfer belt 17. The above-described configuration can reduce the toner contamination of the secondary transfer roller as compared with the configuration in which the length of the scraping pattern KP in the belt moving direction is equal to or longer than the circumferential length of the secondary transfer roller 18 or the configuration in which the interval Sp between the scraping patterns KP is equal to or smaller than the circumferential length of the secondary transfer roller 18.

Performing the cleaning operation and the scraping pattern forming operation at different timings increases the traveling distance of the intermediate transfer belt 17 and may shorten the life of the intermediate transfer belt 17. In addition, performing the cleaning operation and the scraping pattern forming operation at different timings increases the frequency of occurrence of downtime in the image forming apparatus.

In particular, in the present embodiment, the multiple scraping patterns KP are formed at a predetermined timing (that is determined so that the amount of toner staying at the cleaning area is more than a predetermined amount that can suitably remove the filming) in the standard speed image forming mode, which may increase the period of the scraping pattern forming operation. As a result, performing the cleaning operation and the scraping pattern forming operation at different timings increases the traveling distance of the intermediate transfer belt 17 and shortens the life of the intermediate transfer belt 17.

Figure 11:
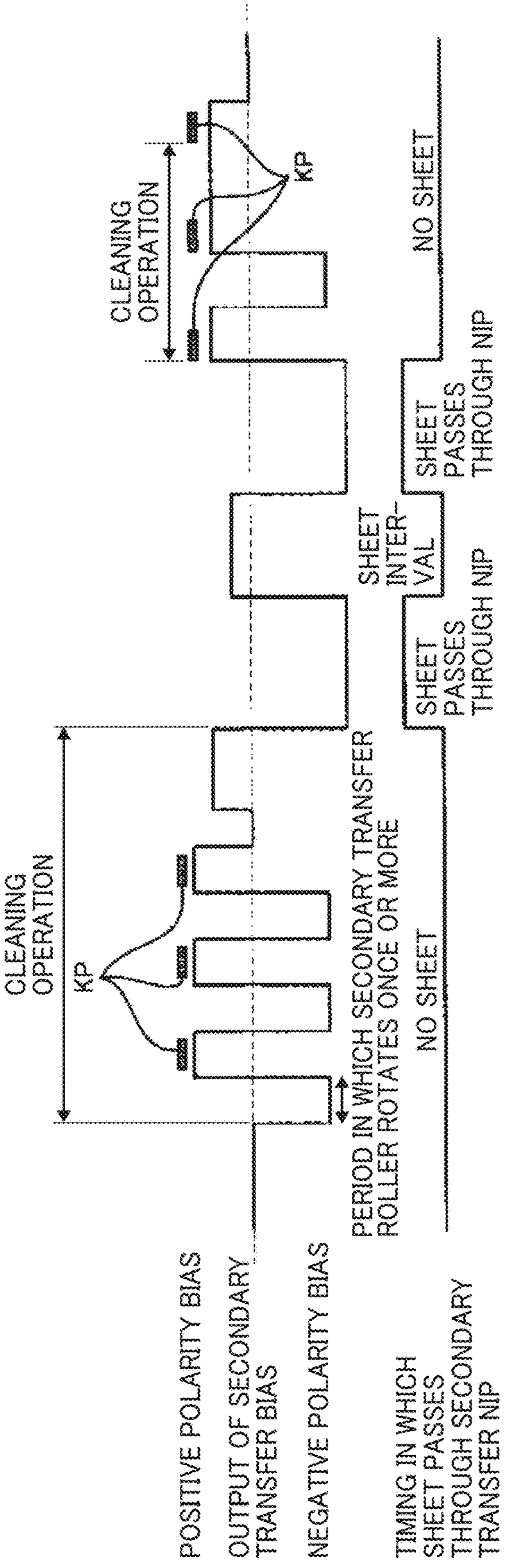
FIG. 11 is a timing chart of a cleaning operation in which multiple scraping patterns pass through a secondary transfer nip during the cleaning operation.

For this reason, the scraping patterns preferably pass through the secondary transfer nip while the positive bias is applied to the opposed roller 18A to perform the cleaning operation as illustrated in FIG. 11.

As described above, forming the alternating electric field in the secondary transfer nip causes the hopping effect to clean the toner adhering to the secondary transfer roller 18 in the present embodiment. As illustrated in FIG. 11, a period while the polarities of the alternating electric field are switched is shorter than a period while the sheet is in the secondary transfer nip. Since the multiple scraping patterns are formed and pass through the secondary transfer nip while the positive bias is applied to the opposed roller to form the alternating electric field, this control can input the next scraping pattern to the cleaning area before the cleaning blade completely removes the toner staying in the cleaning area. As a result, the toner staying at the cleaning area can remove the filming on the intermediate transfer belt continuously for a certain long time. This control can prevent the occurrence of the disadvantage caused by the filming over time in the standard-speed image forming mode.

As illustrated in FIG. 11, each of a period while the positive bias is applied to the opposed roller and a period while the negative bias is applied to the opposed roller is equal to or longer than a period while the secondary transfer roller rotates once. When the multiple scraping patterns are formed, the above-described control enables the length of the scraping pattern KP in the belt moving direction to set to be shorter than the circumferential length of the secondary transfer roller 18 and enables the interval Sp between the scraping patterns KP to set to be longer than the circumferential length of the secondary transfer roller 18.

As a result, the above-described control can prevent the secondary transfer roller from being contaminated with toner and prevent the backside of the sheet from being contaminated. Even when the scraping pattern passes through the secondary transfer nip during the application of the positive bias, the toner having the negative polarity and adhering to the secondary transfer roller can electrostatically adhere to the intermediate transfer belt (or to the scraping pattern on the intermediate transfer belt). Therefore, the scraping pattern hardly affects the cleaning of the secondary transfer roller.

Even if the scraping pattern KP passes through the secondary transfer nip while the bias is set to zero during the cleaning operation, the scraping pattern KP is not transferred to the secondary transfer roller 18. However, the toner of the scraping pattern is not electrostatically attracted to the intermediate transfer belt 17, which is different from the above-described operation performed while the positive bias is applied. As a result, the secondary transfer roller 18 scrapes the scraping pattern at the secondary transfer nip, which increases the amount of toner that adheres to the secondary transfer roller 18 and may worsen the toner contamination of the secondary transfer roller 18. For this reason, it is not preferable to cause the toner to pass through the scraping pattern while the bias is set to zero during the cleaning operation.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The above-described embodiments are given as examples, and, for example, the following aspects of the present disclosure may have advantageous effects described below.

(First Aspect)

In a first aspect, an image forming apparatus includes an image bearer such as the intermediate transfer belt 17, an image forming unit such as the image forming unit 10, a transferor such as the secondary transfer roller 18, a cleaner such as the cleaning blade 31, and circuitry such as the controller 90. The image bearer is movable in a moving direction at multiple linear speeds. The image forming unit contacts the image bearer to form one or more patterns on the image bearer with toner. The transferor contacts the image bearer to form a transfer nip. The cleaner contacts the image bearer to clean the one or more patterns on the image bearer. The circuitry is configured to set one of the multiple linear speeds, determine a number of the one or more patterns based on the one of the multiple linear speeds, and control the image forming unit to form one pattern of the one or more patterns on the image bearer, or form multiple patterns of the one or more patterns on the image bearer at a predetermined interval in the moving direction.

In one type of image forming apparatus known in the art, the circuitry such as the controller changes the linear speed of the image bearer such as the intermediate transfer belt 17 in accordance with the type of paper, the installation environment of the image forming apparatus, and the usage state. As the linear speed of the image bearer increases, the filming of the image bearer is likely to increase. Increasing the amount of toner of a toner image pattern such as the scraping pattern KP to increase the amount of toner input to the cleaner enhances a filming removal effect, which enables the filming to be satisfactorily removed even when the linear speed of the image bearer is set to be high. However, increasing the amount of toner of the toner image pattern means inputting a large amount of toner to the cleaner at a time, which increases the amount of toner blocked by the cleaner. Increasing the amount of toner blocked by the cleaner increases a pressure applied to the cleaner by the toner blocked. The toner may pass through a contact portion at which the cleaner contacts the image bearer, which may cause the cleaning failure. As a result, both of preventing the occurrence of the cleaning failure and satisfactorily removing the filming from the image bearer may not performed. In addition, when the linear speed of the image bearer is set to be slow, the amount of toner input to the cleaner is much greater than the amount for removing filming, which results in the wasteful toner consumption.

To countermeasure the above-described disadvantages, the image forming apparatus according to the first aspect includes the circuitry such as the controller configured to change the number of toner image patterns according to the linear speed of the image bearer. The above-described control can set the amount of toner in the toner image pattern not to cause the cleaning failure and adjust the number of the toner image patterns based on the linear speed of the image bearer, that is, adjust the amount of toner input to the cleaner to a suitable amount to remove the filming on the image bearer. In addition, since the above-described control forms the multiple toner image patterns at predetermined intervals in the moving direction, the above-described control enables the cleaner to block and remove a certain amount of toner of the toner image pattern from the surface of the image bearer to reduce the toner of the toner image pattern blocked by the cleaner to some extent and then input the next toner image pattern to the cleaner. As a result, the amount of toner blocked by the cleaner does not become the amount of toner that causes the cleaning failure.

When the linear speed of the image bearer is set to be high, which is likely to increase the filming, increasing the number of toner image patterns to be formed can satisfactorily remove the filming and prevent the occurrence of the cleaning failure. Reducing the number of the toner image patterns to be formed in the low linear speed of the image bearer to be smaller than the number of the toner image patterns in the high linear speed of the image bearer can prevent the occurrence of the wasteful toner consumption.

(Second Aspect)

In a second aspect, the circuitry in the image forming apparatus according to the first aspect is configured to set a fastest linear speed such as the standard speed among the multiple linear speeds such as the low speed, the medium speed, and the standard speed, determine multiple patterns of the one or more patterns based on the fastest linear speed, and control the image forming unit to form the multiple patterns such as the scraping patterns KP on the image bearer at the predetermined interval in the moving direction.

According to the second aspect, as described in the embodiments, the above-described control performed by the circuitry can prevent a large amount of toner from being input at once to the cleaning area at which the cleaner such as the cleaning blade 31 contacts the image bearer such as the intermediate transfer belt and keep the toner to continuously stay in the cleaning area for a long time to remove the filming on the image bearer. As a result, the above-described control can prevent the occurrence of the cleaning failure and satisfactorily remove the filming on the image bearer.

(Third Aspect)

In a third aspect, the circuitry in the image forming apparatus according to the first aspect or the second aspect is further configured to determine a length of each of the one or more patterns based on the one of the multiple linear speeds.

(Fourth Aspect)

In a fourth aspect, the image forming apparatus according to any one of the first to third aspects further includes multiple image forming units such as the image forming units 10 including the image forming unit. The multiple image forming units are arranged in the moving direction such as the belt moving direction. The multiple image forming units contain different color toners. The circuitry is configured to control the multiple image forming units to form the multiple patterns such as the scraping patterns KP.

According to the fourth aspect, as described with the embodiments, forming the multiple patterns by different color toners prevents the specific color toner from being consumed compared with forming the multiple patterns by one color toner.

(Fifth Aspect)

In a fifth aspect, the circuitry in the image forming apparatus according to the fourth aspect is further configured to control the multiple image forming units to form the multiple patterns in a first order in which colors of the multiple patterns are arranged from downstream to upstream in the moving direction, the different color toners are arranged in a second order, based on colors of the different color toners, in the multiple image forming units from downstream to upstream in the moving direction, and the first order coincides with the second order.

According to the fifth aspect, as described with reference to FIGS. 8A and 8B, a time to form the multiple patterns such as the multiple scraping patterns can be shortened.

(Sixth Aspect)

In a sixth aspect, the circuitry in the image forming apparatus according to the fifth aspect is configured to control the multiple image forming units such as the image forming units 10, successively arranged in the moving direction, to form the multiple patterns such as the multiple scraping patterns KP.

According to the sixth aspect, as described with reference to FIGS. 8A and 8B, the time to form the multiple patterns such as the multiple scraping patterns can be shortened. For example, a time to form the three scraping patterns including the black toner pattern, the cyan toner pattern, and the magenta toner pattern in the image forming apparatus including the image forming units arranged in the order of black, cyan, magenta, and yellow from downstream to upstream in the moving direction can be shorter than a time to form scraping patterns including the black toner pattern, the magenta toner pattern, and the yellow toner pattern and not including the cyan toner pattern.

(Seventh Aspect)

In a seventh aspect, the circuitry in the image forming apparatus according to any one of the first to sixth aspects is configured to control the image forming unit to form the one or more patterns each having a length in the moving direction such as the belt moving direction shorter than a circumferential length of the transferor such as the secondary transfer roller and form the multiple patterns such as the scraping patterns at an interval such as the interval Sp longer than the circumferential length of the transferor.

According to the seventh aspect, as described in the embodiments, the part of the transferor that has come into contact with the pattern at the transfer nip comes into contact with the image bearer after one rotation of the transferor. As a result, the toner of the pattern adhered to the transferor at the transfer nip can be transferred to the surface of the image bearer after the one rotation of the transferor to prevent the contamination of the transferor.

(Eighth Aspect)

In an eighth aspect, each of the one or more patterns such as the scraping pattern KP in the image forming apparatus according to any one of the first to seventh aspects has a long band shape extending in a direction orthogonal to the moving direction such as the belt moving direction.

According to the eighth aspect, the filming on the surface of the image bearer such as the intermediate transfer belt 17 can be uniformly removed.

(Ninth Aspect)

In a ninth aspect, a length of one of the one or more patterns in the direction orthogonal to the moving direction in the image forming apparatus according to the eighth aspect is longer than a largest length of lengths of recording media contacting the image bearer in the direction orthogonal to the moving direction.

According to the ninth aspect, as described in the embodiments, the occurrence of an abnormal image such as a white spot due to the filming in an image formed on a recording medium such as the sheet P can be satisfactorily prevented.

(Tenth Aspect)

In a tenth aspect, the image forming apparatus according to the eighth aspect or the ninth aspect further includes two sensors such as the optical sensors 40R and 40F disposed to face both ends of the image bearer such as the intermediate transfer belt 17 in the direction orthogonal to the moving direction to detect toner adhesion amounts of toner images formed on the image bearer. A length of one of the one or more patterns in the direction orthogonal to the moving direction is equal to or longer than a length from one of the two sensors to another sensor in the direction orthogonal to the moving direction.

According to the tenth aspect, the occurrence of the abnormal image such as the white spot in the image formed on the recording medium such as the sheet P can be satisfactorily prevented. In addition, the filming on the areas of the image bearer facing the sensors such as the optical sensors 40R and 40F disposed so as to face both ends of the image bearer can be satisfactorily removed, and the sensors can satisfactorily detect amounts of toner adhered to the image bearer.

(Eleventh Aspect)

In an eleventh aspect, the image forming apparatus according to any one of the first to tenth aspects further includes a power source outputting a transfer bias to transfer toner from the image bearer to a recording medium and a reverse polarity bias having a polarity opposite to a polarity of the transfer bias, and the circuitry is configured to control the power source to perform a cleaning operation that moves a substance adhered to the transferor such as the secondary transfer roller 18 to the image bearer to clean the image bearer. The circuitry is configured to control the image forming unit and the power source such that the one or more patterns such as the scraping pattern KP pass through the transfer nip while the power source outputs the reverse polarity bias.

As described with reference to FIG. 11, the number of occurrences of downtime in the image forming apparatus according to the eleventh aspect can be reduced to be smaller than that in the image forming apparatus performing the cleaning operation and the pattern forming operation at different timings.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus comprising:

an image bearer movable in a moving direction at multiple linear speeds;

an image forming unit contacting the image bearer to form one or more patterns on the image bearer with toner;

a transferor contacting the image bearer to form a transfer nip;

a cleaner contacting the image bearer to clean the one or more patterns on the image bearer; and circuitry configured to set a linear speed from among the multiple linear speeds as a set linear speed, the multiple linear speeds including a first linear speed and a second linear speed, the second linear speed being greater than the first linear speed, determine a number of the one or more patterns based on the set linear speed, and control the image forming unit to form one pattern of the one or more patterns on the image bearer responsive to the set linear speed being the first linear speed, and form multiple patterns of the one or more patterns on the image bearer at a predetermined interval in the moving direction responsive to the set linear speed being the second linear speed, wherein each of the one or more patterns has a long band shape in a direction orthogonal to the moving direction and a predetermined length in the moving direction.

2. The image forming apparatus according to claim 1, wherein the circuitry is further configured to set the predetermined length of each of the one or more patterns based on the set linear speed.

3. The image forming apparatus according to claim 1, further comprising:

multiple image forming units including the image forming unit, the multiple image forming units arranged in the moving direction, the multiple image forming units containing different color toners, wherein the circuitry is configured to control the multiple image forming units to form the multiple patterns.

4. The image forming apparatus according to claim 3, wherein the circuitry is further configured to control the multiple image forming units to form the multiple patterns in a first order in which colors of the multiple patterns are arranged from downstream to upstream in the moving direction, the different color toners are arranged in a second order, based on colors of the different color toners, in the multiple image forming units from downstream to upstream in the moving direction, and the first order coincides with the second order.

5. The image forming apparatus according to claim 4, wherein the circuitry is further configured to control the multiple image forming units, successively arranged in the moving direction, to form the multiple patterns.

6. The image forming apparatus according to claim 1, wherein a length of a pattern from among the one or more patterns in the direction orthogonal to the moving direction is longer than a largest length of lengths of recording media contacting the image bearer in the direction orthogonal to the moving direction.

7. The image forming apparatus according to claim 1, further comprising:

two sensors respectively facing opposite ends of the image bearer in the direction orthogonal to the moving direction, the two sensors configured to detect toner adhesion amounts of toner images formed on the image bearer, wherein a length of a pattern from among the one or more patterns in the direction orthogonal to the moving direction is equal to or longer than a length from one of the two sensors to another one of the two sensors in the direction orthogonal to the moving direction.

8. The image forming apparatus according to claim 1, wherein the predetermined length in the moving direction of each of the one or more patterns is equal to or longer than 32.5 mm.

9. The image forming apparatus according to claim 1, wherein the circuitry is configured to control the image forming unit to form the one or more patterns to remove, from the image bearer, an external additive within the toner and a lubricant transferred from a surface of the image forming unit to the image bearer.

10. An image forming apparatus comprising:

an image bearer movable in a moving direction at multiple linear speeds;

an image forming unit contacting the image bearer to form one or more patterns on the image bearer with toner;

a transferor contacting the image bearer to form a transfer nip;

a cleaner contacting the image bearer to clean the one or more patterns on the image bearer; and circuitry configured to set a linear speed from among one of the multiple linear speeds as a set linear speed, determine a number of the one or more patterns based on the set linear speed, and control the image forming unit to form one pattern of the one or more patterns on the image bearer, or form multiple patterns of the one or more patterns on the image bearer at a predetermined interval in the moving direction, wherein each of the one or more patterns has a length in the moving direction shorter than a circumferential length of the transferor, and the predetermined interval in the moving direction is longer than the circumferential length of the transferor.

11. The image forming apparatus according to claim 10, wherein the circuitry is configured to control the image forming unit to form the one or more patterns to remove, from the image bearer, an external additive within the toner and a lubricant transferred from a surface of the image forming unit to the image bearer.

12. An image forming apparatus comprising:

an image bearer movable in a moving direction at multiple linear speeds;

an image forming unit contacting the image bearer to form one or more patterns on the image bearer with toner;

a transferor contacting the image bearer to form a transfer nip;

a cleaner contacting the image bearer to clean the one or more patterns on the image bearer;

circuitry configured to set a linear speed from among the multiple linear speeds as a set linear speed, determine a number of the one or more patterns based on the set linear speed, and control the image forming unit to form one pattern of the one or more patterns on the image bearer, or form multiple patterns of the one or more patterns on the image bearer at a predetermined interval in the moving direction; and a power source configured to output a transfer bias to transfer the toner from the image bearer to a recording medium and a reverse polarity bias having a polarity opposite to a polarity of the transfer bias, wherein the circuitry is further configured to control the power source to perform a cleaning operation that moves a substance adhered to the transferor to the image bearer to clean the image bearer, and control the image forming unit and the power source such that the one or more patterns pass through the transfer nip while the power source outputs the reverse polarity bias.

* * * * *